United States Patent
Henderson

(10) Patent No.: US 9,148,077 B2
(45) Date of Patent: Sep. 29, 2015

(54) MAGNETIC LEVITATION OF A STATIONARY OR MOVING OBJECT

(71) Applicant: ARX PAX, LLC, San Jose, CA (US)

(72) Inventor: D. Gregory Henderson, San Jose, CA (US)

(73) Assignee: Arx Pax, LLC, Saratoga, CA (US)

( * ) Notice: Subject to any disclaimer, the term of this patent is extended or adjusted under 35 U.S.C. 154(b) by 0 days.

(21) Appl. No.: 14/069,359

(22) Filed: Oct. 31, 2013

(65) Prior Publication Data

US 2014/0265690 A1 Sep. 18, 2014

Related U.S. Application Data

(60) Provisional application No. 61/799,695, filed on Mar. 15, 2013.

(51) Int. Cl.
*B60L 13/04* (2006.01)
*H02N 15/00* (2006.01)
*H02K 7/09* (2006.01)

(52) U.S. Cl.
CPC ............... *H02N 15/00* (2013.01); *B60L 13/04* (2013.01); *H02K 7/09* (2013.01)

(58) Field of Classification Search
CPC ................... H02K 7/09; H02K 41/00–41/033; H02N 15/00–15/04; F16C 32/04; B60L 13/04
USPC .................. 310/90.5, 103, 104, 12.01–12.33; 104/281–283, 286; 180/180
IPC ....................................................... H02K 7/09
See application file for complete search history.

(56) References Cited

U.S. PATENT DOCUMENTS

| | | | |
|---|---|---|---|
| 3,858,521 A | | 1/1975 | Atherton |
| 4,027,597 A | * | 6/1977 | Lang ............................. 104/294 |
| 4,355,276 A | * | 10/1982 | Vittay ................................ 322/4 |
| 4,578,610 A | | 3/1986 | Kliman et al. |

(Continued)

FOREIGN PATENT DOCUMENTS

| | | |
|---|---|---|
| EP | 2371613 A1 | 10/2011 |
| JP | H09261805 A | 10/1997 |

(Continued)

OTHER PUBLICATIONS

Video 1: 작업중 3. uploaded Mar. 24, 2011 Video1: http://www.youtube.com/watch?v=2qhVjBddRr4&list=UUKAYp8lnwJcG-FVL0g3nWUQ.*

(Continued)

*Primary Examiner* — Thomas Truong
(74) *Attorney, Agent, or Firm* — Kwan & Olynick LLP

(57) ABSTRACT

A magnetic lifting device is described. The magnetic lifting device can be configured to generate magnetic lift using a moving magnetic field to generate an eddy current effect in conductive substrate beneath the device. In one embodiment, the moving magnetic field can be generated by a rotor with arrangement of permanent magnets which is driven by a motor. In operation, the rotor can be spun up from rest to above a threshold velocity, which causes the magnetic lifting device to rise up from the conductive substrate, hover in place in free flight and move from location to location. In free flight, the magnetic lifting device can be configured to carry a payload, such as a person.

16 Claims, 19 Drawing Sheets

(56) References Cited

U.S. PATENT DOCUMENTS

| | | | |
|---|---|---|---|
| 5,270,596 A | | 12/1993 | Shibuya et al. |
| 5,467,718 A | * | 11/1995 | Shibata et al. ............... 104/284 |
| 5,495,221 A | | 2/1996 | Post |
| 5,705,902 A | | 1/1998 | Merritt et al. |
| 5,722,326 A | | 3/1998 | Post |
| 5,821,658 A | | 10/1998 | Boggs, III |
| 5,847,480 A | | 12/1998 | Post |
| 6,191,515 B1 | | 2/2001 | Post |
| 6,503,318 B2 | | 1/2003 | Pye et al. |
| 6,564,882 B2 | | 5/2003 | Durmeyer et al. |
| 6,629,503 B2 | | 10/2003 | Post |
| 6,657,344 B2 | | 12/2003 | Post |
| 6,792,335 B2 | | 9/2004 | Ross |
| 6,858,962 B2 | | 2/2005 | Post et al. |
| 7,122,923 B2 | | 10/2006 | Lafontaine et al. |
| 7,559,384 B2 | * | 7/2009 | Palladino ................... 180/53.8 |
| 7,598,646 B2 | | 10/2009 | Cleveland |
| 8,009,001 B1 | | 8/2011 | Cleveland |
| 8,294,316 B2 | | 10/2012 | Blackwelder et al. |
| 2002/0084705 A1 | | 7/2002 | Kawamura |
| 2007/0166110 A1 | | 7/2007 | Kenady |
| 2007/0222304 A1 | * | 9/2007 | Jajtic et al. ..................... 310/12 |
| 2009/0229487 A1 | * | 9/2009 | Crawford et al. ............. 104/281 |
| 2011/0272398 A1 | * | 11/2011 | Berdut Teruel ............... 219/672 |
| 2013/0020895 A1 | * | 1/2013 | Scalzo et al. ................. 310/90.5 |
| 2015/0175031 A1 | | 6/2015 | Henderson et al. |

FOREIGN PATENT DOCUMENTS

| | | | | |
|---|---|---|---|---|
| JP | 2004534496 A | | 11/2004 | |
| JP | 2007215264 A | * | 8/2007 | |
| JP | 2012019618 A | * | 1/2012 | |
| KR | 1020050078514 A | | 8/2005 | |
| KR | 1020100045720 A | | 5/2010 | |
| WO | WO 2009054937 A2 | * | 4/2009 | ............ B64C 27/10 |
| WO | 2014149626 A1 | | 9/2014 | |

OTHER PUBLICATIONS

Video 2 Hoverboard & Hovercar maglev (magnetic levitation board & car). Uploaded on Oct. 9, 2011 Video 2: http://www.youtube.com/watch?v=uHEQgjNcFBo.*

Video 3: Stevenson, Scott A., Lenz's Law Magnetic Levitating Top—Demonstration & Explanation. Uploaded on Jul. 5, 2009. Video 3: http://www.youtube.com/watch?v=dw73DcwIX-A.*

Translation of Korean video 2 script Mar. 2014.*

Eichenberg et al., "Deverlopment and Testing of an Axial Halbach Magnetic Bearing", NASA Jul. 2006.*

Machine translation of Nishimura, Isao JP 2012019618 Sep. 2014.*

JPO Machine Translation, Morita, JP 2007215264 A, Aug. 23, 2007.*

JPO Machine Translation, Tsutsui et al., JP 09261805 A, Oct. 3, 1997.*

USPTO Partial Translation, Nishimura, JP 2012019618 A, Jan. 26, 2012.*

"Launchpoint Technologies 6" Dual Halbach Air-core Motor", Revision 1.0, Retrieved from the Internet <http://www.launchpnt.com/Portals/53140/docs/dual-halbach-motor-data-sheet_r1.pdf>, 3 pgs.

Ricci, Mike, "High Efficiency, High Power Density Electric Motors", Launchpoint Technologies, Retrieved from the Internet <http://www.google.com/url?sa=t&rct=j&q=&esrc=s&source=web&cd=3&ved=0CFIQFjAC&url=http%3A%2F%2Fwww.launchpnt.com%2FPortals%2F53140%2Fdocs%2Flaunchpoint-halbach-motor-presentation-2010.ppt&ei=vJByUv2sNMTlygGLxIGIBg&usg=AFQjCNG5_F, Jul. 27, 2010, 12 pgs.

"Int'l Application Serial No. PCT/US2014/019956, Search Report and Written Opinion mailed Jun. 24, 2014", 11 pgs.

Ham, Chan et al., "Study of a Hybrid Magnet Array for an Electrodynamic Maglev Control", Journal of Magnetics, vol. 18, No. 3., Sep. 2013, 370-374.

Hoburg, J.F. et al., "A Laminated Track for the Inductrack System: Theory and Experiment", 18th International Conference on Magneticaly Levitated Systems and Linear Drives, Shanghai, China, Jan. 13, 2004, 5 pgs.

Post, Richard F. et al., "The Design of Halbach Arrays for Inductrack Maglev Systems", 6 pgs.

Post, Richard F. , "The Inductrack: A Simpler Approach to Magnetic Levitation", IEEE Transactions on Applied Superconductivity, vol. 10, n. I, doi:IO.II09/77.828377, Lawrence Livermore National Laboratory, Livermore CA, Mar. 2000, 901-904.

"The 25 Best Inventions of 2014: Hoverboards, intelligent space craft, edible food wrappers, and much much more", Time Magazine, <http://time.com/3594971/the-25-best-inventions-of-2014/>, Nov. 20, 2014.

Allain, Rhett , "The Physics of the Hendo Hoverboard", Wired <http://www.wired.com/2014/10/physics-hendo-hoverboard/>, Oct. 24, 2014.

Constine, Josh , "How It Feels to Ride a real Hoverboard", techcrunch.com <http://techcrunch.com/2014/12/07/an-elevated-experience/>, Dec. 7, 2014.

Dougherty, Conor , "Hoverboard? Still in the Future", The New York Times <http://www.bytimes.com/2014,10/21/technology/hoverboard-still-in-future.html?_r=1, Jan. 21, 2015.

Lavelle, Marianne, "Four 2015 Energy Ideas 'Back to the Future' Got (Almost) Right", National Geographic <http://news.nationalgeographic.com/news/energy/2014/12/141224-back-to-the-future-energy-hoverboards-flying-cars/>, Dec. 23, 2014.

Palermo, Elizabeth , "Look Ma, No Hands! Here's How This Supercool Hoverboard Works", livescience <http://www.livescience.com/49105-how-hoverboards-work.html>, Dec. 12, 2014.

Santus, Rex , "Tony Hawk rides a hoverboard, for real this time", Mashable <http://mashable.com/2014/11/18/tony-hawk-hoverboard-real/, Nov. 18, 2014, 3.

Stuart, Emma , "Back to the Future's technology predictions", Engineering and Technology Magazine <http://eandt.theiet.org/explore/students/2015/back-to-the-future-transport-technology.cfm>, Jan. 21, 2015.

"U.S. Appl. No. 14/639,045, Examiner Interview Summary mailed May 1, 2015".

"U.S. Appl. No. 14/639,045, Examiner Interview Summary mailed Jun. 9, 2015".

"U.S. Appl. No. 14/639,045, Examiner Interview Summary mailed Jul. 14, 2015".

"U.S. Appl. No. 14/639,045, Non Final Office Action mailed Apr. 20, 2015".

"Video Publication", SFEnergy, Hoverboard & Hovercar maglev (magnetic levitation board & car), Oct. 9, 2011, https://www.youtube.com/watch?v=uHEQgjNcFBot., Oct. 9, 2011, 2 pgs.

"Video Publication", SFEnergy, 작업중 3 Apr. 24, 2011, https://www.youtube.com/watch?v=2qhVjBddRr4t., Apr. 24, 2011, 4 pgs.

Bloom, Laura B. , "Skateboarding Legend Tony Hawk Test Drives the World's First Hoverboard", Yahoo <https://www.yahoo.com/travel/skateboarding-legend-tony-hawk-test-drives-the-worlds-102899995187.html>, Nov. 17, 2014.

Paudel, N et al., "General 2-D Transient Eddy Current Force Equations for a Magnetic Source Moving Above a Conductive Plate", Progress in Electromagnetics Research B. vol. 43, 255-277, 2012, 23 pgs.

Paudel, N et al., "Modeling the Dynamic Electromechanical Suspension Behavior of an Electrodynamic Eddy Current Maglev Device", Progress in Electromagnetics Research B, vol. 49, 1-30, 2013, 30 pgs.

* cited by examiner

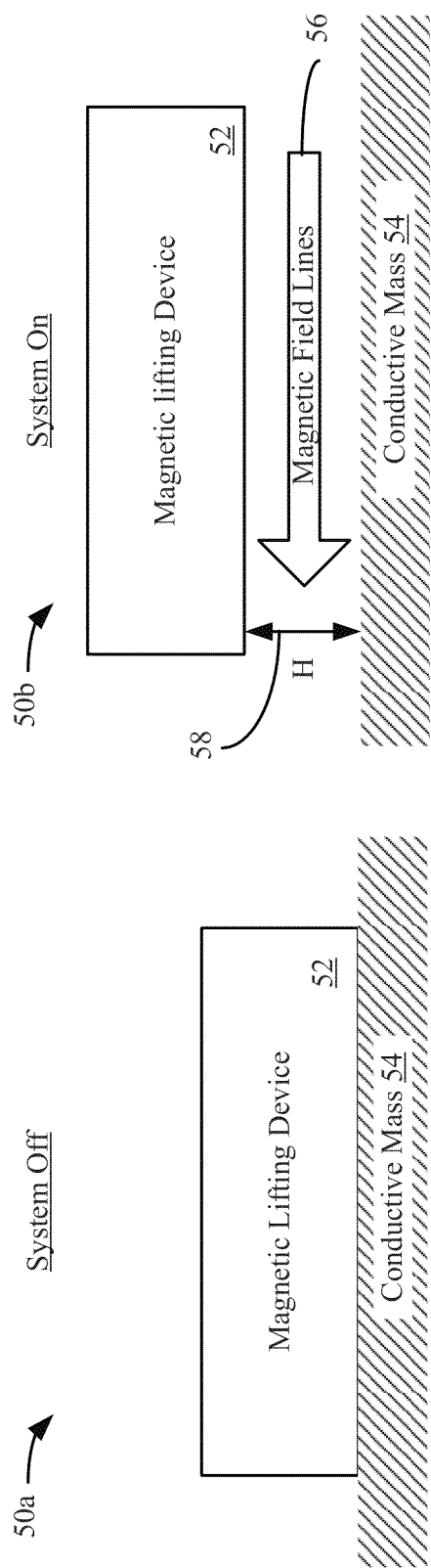
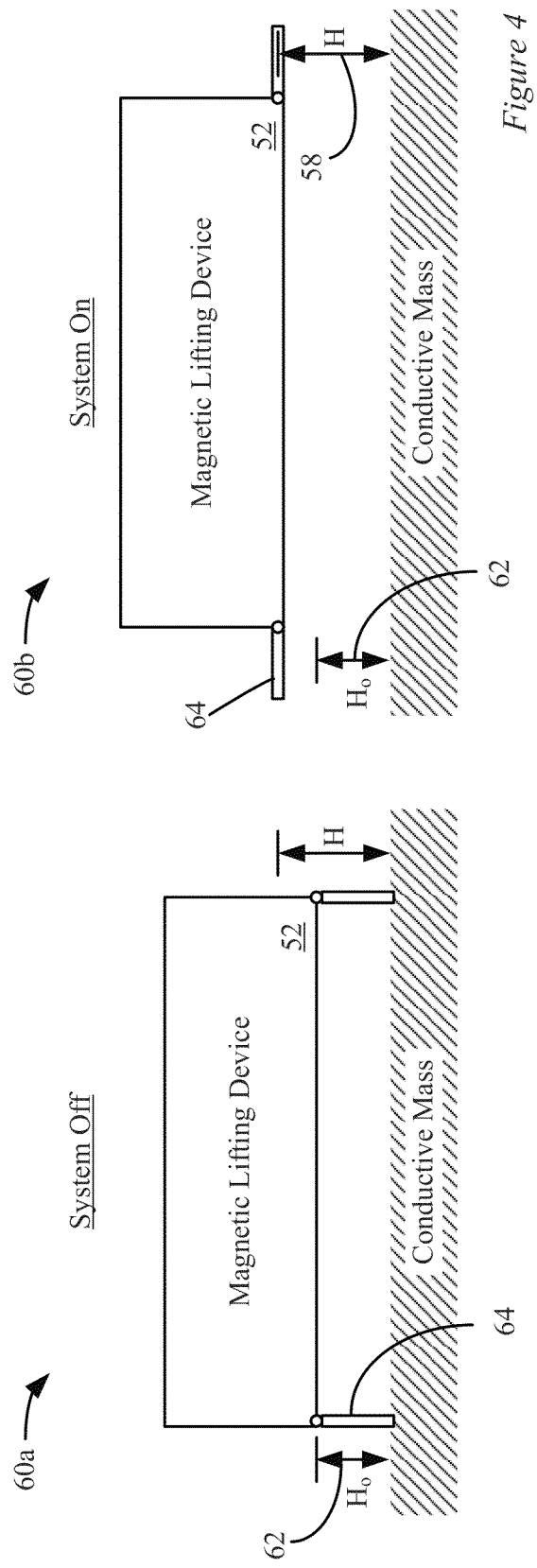
Figure 3
Figure 4

US 9,148,077 B2

MAGNETIC LEVITATION OF A STATIONARY OR MOVING OBJECT

CROSS-REFERENCE TO RELATED APPLICATIONS

This patent application claims priority under 35 U.S.C. §119(e) to U.S. Provisional Patent Application Ser. No. 61/799,695, filed Mar. 15, 2013, titled, "Magnetic Levitation Of A Stationary Or Moving Object," which is incorporated by reference in its entirety and for all purposes.

FIELD OF THE INVENTION

This invention generally relates to magnetic levitation systems, and more particularly to stationary magnetic levitation of an object via the generation of an induced magnetic field.

BACKGROUND

It is well known that two permanent magnets will attract or repulse one another at close distances depending on how the poles of the magnets are aligned. When aligned with the gravitational force vector, magnetic repulsion can be used to counteract gravity and lift an object. For the purposes of lifting an object and then moving it from one location to another location, magnetic repulsion is either unstable or too stable. In particular, opposing magnets can either be aligned such that the object remains in place but then can't be easily be moved to another location or the magnets can be aligned such that the object is easily moveable but won't remain in place but not both.

Another magnetic repulsion effect is associated with generating a moving magnetic field near a conductive object. When a permanent magnet is moved near a conductive object, such as a metal object, eddy currents are established in the conductive object, which generate an opposing magnetic field. For example, when a permanent magnet is dropped through a copper pipe, an opposing magnetic field is generated which significantly slows the magnet as compared to a non-magnetic object dropped through the pipe. This effect is described by Lenz's law.

The eddy current effect has been proposed as a means of generating magnetic lift. For example, the eddy current effect has been proposed for use in "Maglev" trains (Maglev is short for magnetic levitation). In a Maglev train application using the eddy current effect, magnetic arrays of permanent magnets coupled to the train cars are moved over a conductive track. The movement of the magnetic field generated by the magnetic arrays induces an opposing magnetic field in the conductive track, which lifts the train cars. As compared to using two groups of magnets with opposing magnet fields (e.g., magnet arrays in the tracks and on the train cars), an advantage of this approach is that only one portion of the system, i.e., the train cars, require permanent magnets or some other mechanism for actively generating the magnetic field.

In operation, the magnetically equipped train is accelerated from a resting position and through a threshold velocity using some propulsive mechanism. During this period, the opposing magnet field induced in the conductive tracks is not sufficient to lift the train cars. However, once the train cars reach the threshold velocity, a sufficient opposing magnetic field is induced in the conductive tracks via the eddy current effect such that the train cars are magnetically levitated at some height over the conductive tracks.

Since the train cars must be moving to generate the magnetic lift in this manner, the system is not suitable for magnetically lifting an object while it remains in a stationary position. In view of the above, new methods and apparatus for generating magnetic lift are needed. In particular, magnetic levitation systems are needed which allow an object to be magnetically lifted while in a stationary position and while being moved from the stationary position to another stationary position.

SUMMARY

A magnetic lift system is described. The magnetic lift system includes a magnetic lifting device and a conductive substrate. The magnetic lifting device is configured to generate a moving magnetic field which induces eddy currents in the conductive substrate. The eddy currents provide an opposing magnetic field, which generates magnetic lift. The magnetic lift can be sufficient to support the magnetic lifting device and a payload in hovering free flight. In one embodiment, the magnetic lifting device can be a hover-board where the payload is a person.

In one embodiment, the moving magnetic field can be generated by one or more rotors with arrangement of permanent magnets. The rotors can be driven by a motor, such as an electric motor or a combustion engine. The motor can include an onboard power source, such as a battery or tank for holding a combustible fuel.

In operation, via motor, the one or more rotors can be spun up from rest to above a threshold velocity, which causes the magnetic lifting device to rise up from a conductive substrate and hover in place in free flight. A conductive substrate can include a non-ferromagnetic conductive metal of some type. For example, the conductive substrate can be a thin sheet or lattice work of aluminum or copper.

While hovering above the substrate, the magnetic lifting device and payload can be maneuvered from one location to another. For example, an individual can push the device from a first location to another location. When the magnetic lifting device is positioned at a desired location, the rotors can be spun down and the magnetic lifting device and payload can move from hovering free flight position to a rest on the conductive substrate at the desired location.

One aspect of the embodiments described herein can be generally characterized as a magnetic lifting device. The magnetic lifting device can include a rotor having an arrangement of permanent magnets. The magnets can be arranged to bias the strength of the magnetic field such that it is stronger on one side of the rotor as opposed to another side of the rotor. For example, the magnets can be arranged in a Halbach array to generate this effect. To drive the rotor, a motor can be coupled to the rotor.

The magnetic lifting device can include a payload platform configured to receive a payload. In one embodiment, the payload platform can allow a person to stand on the device while it is hovering in place. A controller, coupled to the motor, can be configured to control the motor to rotate the rotor at a rotational velocity which causes the magnetic lifting device and the payload to hover in free flight at a height above the conductive substrate. The rotor, the motor, the payload platform and the controller can be structural linked to one another. In addition, a housing can surround all or a portion of the motor, rotor and controller.

In various embodiments, the magnetic lifting device can include a number of different mechanisms which can be used to supplement and/or support its motion. For example, wheels or rollers can be provided with the magnetic lifting device. The wheels or rollers can aid in moving the magnetic lifting device from location to another, such as but not limited to when magnetic lift is not being generated. Further, the wheels or rollers can act as landing gear. In one embodiment, the wheels can be coupled to a motor to generate a propulsive force used to move the magnetic lifting device from one location to another. In another embodiment, a propulsion mechanism, such as a turbine or propeller which generates thrust can be coupled to the magnetic lifting device. In another example, gyroscopes or other stabilization mechanisms can be coupled to the magnetic lifting device to stabilize and control its motion, such as its motion while in flight.

BRIEF DESCRIPTION OF THE DRAWINGS

The included drawings are for illustrative purposes and serve only to provide examples of possible structures and process steps for the disclosed inventive systems and methods. These drawings in no way limit any changes in form and detail that may be made to the invention by one skilled in the art without departing from the spirit and scope of the invention.

FIGS. 3 and 4 are diagrams illustrating operation of a magnetic lifting system in accordance with the described embodiments.

DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

With respect to the following figures and sections magnetic lifting systems and their operation are described. In particular with respect to a first section, titled "Magnetic Lifting System, Components and Operation," encompassing FIGS. 1-6, some general examples of possible components of magnetic lifting systems, associated components and their arrangements and principals of operation are described. In a second section, titled, "Mechanisms for Generating a Moving Magnetic Field," encompassing FIG. 7-13, arrangements of components used to generate a moving magnetic field are described. In particular, rotors having an arrangement of permanent magnets coupled to a motor are described. In a third section, titled, Magnetic Lifting Systems having Multiple Rotating Disks," encompassing FIGS. 14-20, embodiments of a magnetic lifting device utilizing multiple rotating disks for generating the moving magnetic field are described. In particular, different arrangements of rotating disks and motor coupling mechanisms are described for devices with two, three and four rotors. These configurations are described for illustrative purposes only as devices with more rotors are possible. Finally, in a fourth section, titled "Magnetic Lifting System Applications," encompassing FIGS. 21-25, a few possible applications and operating scenarios for magnetic lifting devices are described.

Magnetic Lifting Systems, Components and Operation

Figure 1:
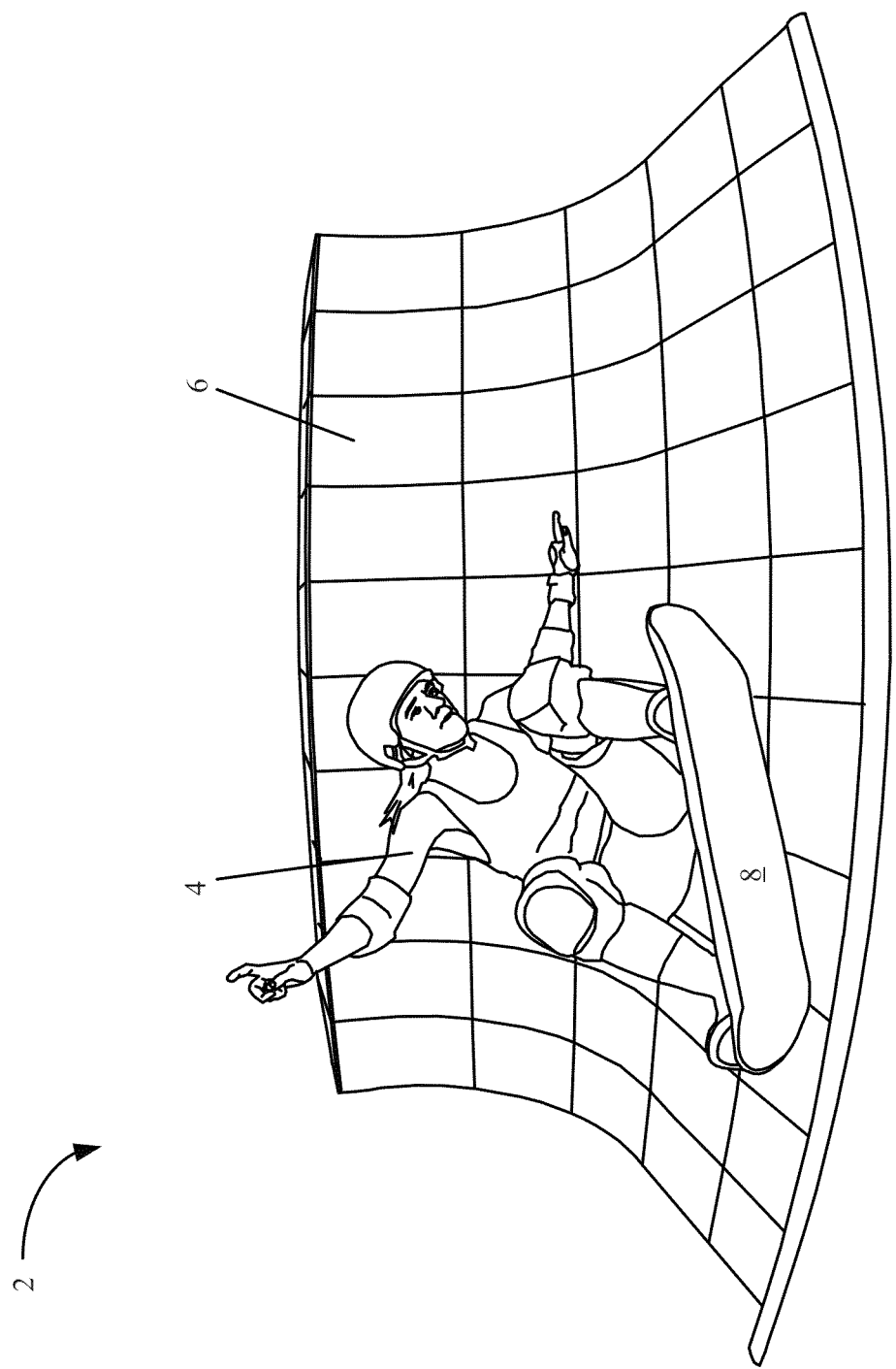
FIG. 1 is an illustration of a magnetic lifting system including a hover-board in accordance with the described embodiments.

In this section, methods of generating magnetic lift, components used to generate magnetic lift, magnetic lift systems and their operation are described. FIG. 1 is an illustration of a magnetic lifting system 2 including a hover-board 8. The hover-board 8 can be configured to generate magnetic lift as will be described below. The magnetic lift allows the device hover above a conductive substrate, such as half pipe 6. The magnetic lift which is generated can be sufficient to support the weight of person, such as person 4.

In FIG. 1, the person 4 is riding the hover-board 8 above conductive surface 6. The conductive surface 6 includes a number or curved portion. In 2, the conductive surface is a half-pipe shape. The bottom of the half-pipe can be relatively flat. In operation, a person, such as 4, may hover up and down on the sides of the half-pipe using hover-board 8. Details of magnetic lifting systems, such as system 2, which allows a person to ride a hover-board, are now described as follows.

Figure 2:
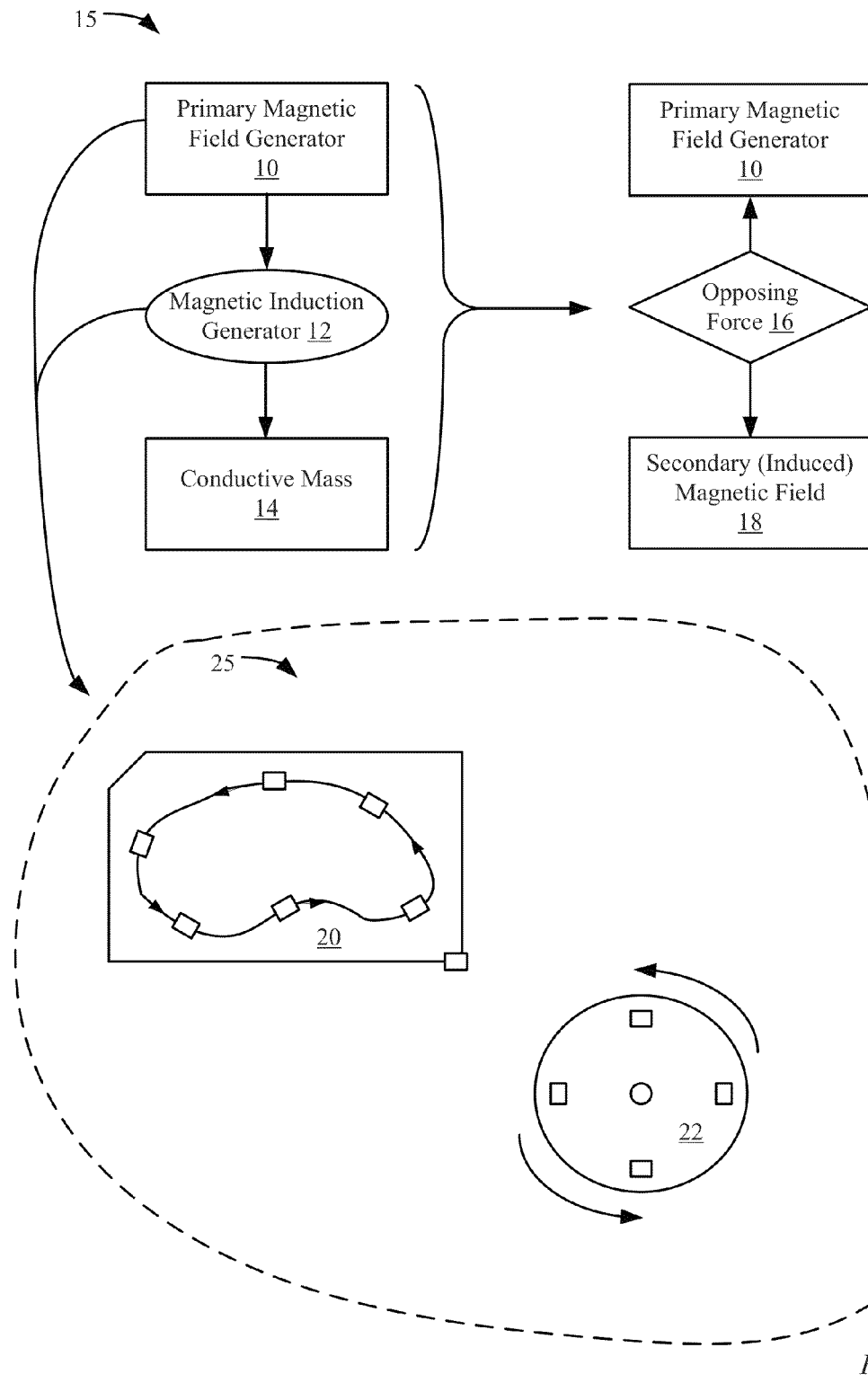
FIG. 2 is a block diagram illustrating methods of generating magnetic lift in accordance with the described embodiments.

FIG. 2 is a block diagram illustrating methods of generating magnetic lift in accordance with the described embodiments. In a particular embodiment, a magnetic eddy current effect is used to generate the magnetic lift. The magnetic eddy current effect is associated with Lenz's law. Lenz's law states that the current induced in a circuit due to a change in the magnetic field is so directed as to oppose the change in flux or to exert a mechanical force opposing the motion.

A magnetic lifting system 15 using an eddy current effect can include a primary magnetic field generator 10, a magnetic induction generator 12 and a conductive mass 14. The magnetic field generator 10 generates the primary magnetic field. The magnetic induction generator 12 imparts a motion to one or more components in the magnetic lifting system. The motion causes a movement of the primary magnetic field relative to a conductive mass 14 which induces a secondary magnetic field 18 in the conductive mass 14.

When the magnetic induction generator 12 is operating, the secondary magnetic field 18 is induced in the conductive mass 14. The secondary magnetic field opposes the primary magnetic field. Thus, when the primary magnetic field is generated in a first component of the system 15 and the secondary magnetic field is generated in a second component of the system 15, an opposing force 16 can be generated between the first component and the second component.

In particular embodiments, the first component and the second component can be arranged such that all or a portion of the opposing force 16 is an opposite direction of the gravitation forces acting on the first component or the second component. The portion of the opposing force 16 which counteracts the gravitational force can be referred to as magnetic lift. For example, a first component including permanent magnets can be rotated above a surface of a conductive mass in a second component where the surface is perpendicular to the gravitational vector. The rotation of the first component causes a movement of the primary magnetic field associated with the permanent magnets, which induces the secondary magnetic field in the conductive mass, in the second component. Then, the secondary magnetic field causes the first component to rise to some height above the surface of the conductive mass. This effect is described in more detail with respect to FIG. 3.

In general, the primary magnetic field can remain stationary and the conductive mass can be moved relative to the primary magnetic field or the conductive mass can remain stationary while the primary magnetic field is moved relative to the conductive mass. It is also possible that both primary magnetic field and the conductive mass can each be placed in motion where there is some relative motion between the two. As an example, a moving primary magnetic field can be generated in a set of coils by selectively sending a current to different coils in a set of coils to induce a secondary magnetic field in a conductive mass which is stationary or moving. As another example, a set of permanent magnets can be moved relative to a conductive mass which is stationary or moving as long as there is relative motion between the conductive mass and the permanent magnets. As yet another example, a conductive mass can be moved relative to a set of stationary permanent magnets.

In some embodiments, the magnetic lift system 15 can include components 25 having one or more permanent magnets which are moved in a repeating pattern of some type. At a sufficient velocity, the movement of the permanent magnets in the looping pattern induces the secondary magnetic field in the conductive mass 14 such that the components 25 are magnetically levitated. While the magnets are moved in the repeating pattern, the magnetic lift system can maintain relatively constant height above the ground without inducing translational motions of the object relative to the ground, i.e., the object can be levitated in a stationary position.

In one embodiment, one or more permanents magnets can be moved along a track mounted to a substrate 20. The track is arranged in a closed loop, which can be symmetrically or irregularly shaped. Thus, the magnets move in a repeating pattern as laps are made around the track. A device which causes the magnets to move along the track and its power source can also be coupled to the substrate. For example, the magnets can be coupled to a belt or chain where the belt or chain is driven by a motor. When the permanent magnets are moved fast enough, magnetic lift can be generated.

In other embodiments, the permanent magnets can be mounted on a substrate 22, which is rotated about some axis. A device, such as a motor, can be coupled to the substrate which can generate the rotational forces imparted to the substrate 22. In one embodiment, the substrate 22 can be disk shaped and relatively planar. However, in other embodiments, the substrate can be non-planar and irregularly shaped. Thus, the example of a disk is provided for the purposes of illustration only and is not meant to be limiting.

In particular embodiments, the conductive mass can be a conductive metal, such as copper, aluminum, silver or gold. Also, the conductive mass can be a liquid, such as water. The water can be mixed with salt or some other material, which increases its conductivity. In yet another embodiment, the conductive mass can be composite material, such as a conductive concrete. In general, the material is selected to be sufficiently conductive to allow eddy currents of a sufficient strength to form.

When the conductive mass is a liquid, such as salt water, in addition to generating magnetic lift, a translational motion can be generated and the liquid can be moved via magnetic repulsion. In one embodiment, this effect can be used to circulate or pump a liquid. In another embodiment, this effect can be used as means of propulsion, such as to propel a boat or a submarine through the ocean.

Next, some details of the operation of magnetic lift system using induced eddy currents are described with respect to FIGS. 3 and 4. In FIG. 3, a magnetic lifting system in an off state 50a and on state 50b is shown. The magnetic lifting system can include a self-contained magnetic lifting device 52. As will be described in more detail below with respect to FIGS. 5 and 6, the magnetic lifting device 52 can include mechanisms for generating a primary magnetic field and moving it relative to the conductive mass 54. In operation, a repulsive force is generated which causes the magnetic lifting device 52 to hover in a stationary position above the conductive mass.

When the system is off in 50a, the magnetic lifting device 52 rests on the conductive mass 54. When the system is turned on in 50b, the magnetic lifting device 52 is configured to provide moving magnetic field lines 56. In some embodiments, when the magnetic lifting device is light enough, the time varying position of the magnetic field interacts with the conductive mass 54 to generate a repulsive force which causes the magnetic lifting device 52 to levitate in a relatively stationary position above the conductive mass 54.

The magnetic lifting device 52 can be designed to meet a weight constraint where the device is light enough to generate enough lift to maintain stationary levitation. In some embodiment, the magnetic lifting device 52 can be configured to carry a payload. For example, in one embodiment, the magnetic lifting device 52 can be configured to lift up to 300 pounds which would allow the device to lift most people. In this example, the weight constraint is the weight of the magnetic lifting device and the maximum payload weight.

Larger payloads are possible. For example, a single magnetic lifting device or multiple magnetic lifting devices can be configured to lift a house, such as lifting a house about its foundation. A typical house not including its foundation can weigh from 80,000 to 200,000 pounds depending on its size, the number of stories and building materials. It may be possible to lift larger multi-story buildings of even a greater weight using one or more magnetic lifting devices.

In FIGS. 3 and 4, the magnetic lifting device is on top and the conductive mass 54 is on the bottom. Thus, the magnetic lifting device is levitated when the system is turn on in 50b and 60b. However, in other embodiments, the magnetic lifting device 52 can be on the bottom and anchored to the ground (or other substrate) and the conductive mass 54 can be placed above the magnetic lifting device 52. In such embodiments, the conductive mass 54 can be levitated when the system is turned on.

The magnetic lifting effect may not be immediate in the sense that the magnetic lifting device may remain at rest for some time period on the conductive mass until the magnetic field 56 reaches a threshold rate of movement. The time to reach this threshold value may vary depending on the type of mechanism used to generate the magnetic field. When the threshold value is reached, the magnetic lifting device 52 can rise off of the conductive mass and reach a stationary position, such as height 58.

The repulsive force can dissipate as the height increases. Thus, based upon, the weight of the magnetic lifting device, the strength of the magnetic field that is generated, speed of the magnetic field and the properties of the conductive mass, some average equilibrium height 58 can be reached. It is possible that the magnetic lifting device may wobble. Thus, the equilibrium height can be specified as an average value over time. In one embodiment, the equilibrium height can be about 4 inches or less.

In particular embodiments, the magnetic lifting device 52 can include a control system which allows the average equilibrium height 58 to be altered. For example, the magnetic lifting device 52 can include a mechanism which allows a strength of the primary magnetic field to be increased or decreased such that the average equilibrium height 58 is increased or decreased. As another example, a rate of movement of the primary magnetic field can be varied to affect the average equilibrium height.

As described above, a mechanism can be provided which provides a rate of movement to the primary magnetic field. The mechanism can be configured to accelerate a magnetic field, which is at rest or at some rate of movement below a threshold value needed to lift the magnetic lifting device 52, to a rate of movement above the threshold value needed to lift the magnetic lifting device 52. The acceleration can occur over a short period of time. For example, the acceleration time can be about 0.5-1.0 seconds. In other embodiments, the acceleration time can be about 0.1-0.5 seconds. In some embodiments, the acceleration mechanism can include: an explosive charge, a kinetic capacitor, a magnetic acceleration device "rail gun," a mechanical energy storage device, a combustion engine, a rotational energy storage device (e.g., flywheel), a chemical energy storage device, a potential energy storage device, or any combination of the above.

As an example of an acceleration mechanism, a motor can accelerate a disk including permanent magnets at rest or some RPM value below a threshold value to an RPM equal to or above the threshold value. For example, the motor can be an electric motor or a combustion engine. A control system can be programmed to produce a spin-up RPM profile, such as from zero to the threshold value over some period, via control of the motor. The RPM profile which is generated can include linear and non-linear portions. The control system can also be programmed to produce a spin down profile such as an RPM value above the threshold value to zero or some RPM value below the threshold value. The RPM profile can be selected to provide a desired response time without damaging the motor. In one embodiment, the magnetic lifting device can include one or more brakes for slowing down a rotating component, such as a friction brake or magnetic brake.

The spin up profile and spin down profile may be different from another. In the spin up phase, the magnetic lift is acting against gravity which limits the upward acceleration. However, in the spin down phase, the magnetic lifting device 52 can be controlled to affect how hard the magnetic lifting device hits the ground (i.e., the conductive mass 54). Different payloads may be more sensitive to a ground impact than other payloads. Thus, a different spin down profile can be selected based upon an impact sensitivity of the payload.

In particular embodiments, the control system can be configured to accept user initiated input signals. The user initiated signals can be used to control one or more aspects of the magnetic lifting devices 52 operation. For example, input mechanisms can be provided which allow a user to one or more of turn on the device, turn off the device, cause it to go from a resting state to a hovering state, cause it to go from hovering state to a resting state, change a hovering height or move from location to another, change a rotational speed of a motor, etc.

There are many possible input devices which can used to input a control input signal to a magnetic device. These input devices can include but are not limited to mechanical switches, mechanical buttons, touch screen interface buttons, mechanisms which can be rotated or tilted, a wheel, a joy stick, a key pad, a roller ball, a touch pad, a foot pedal, a lever arm, a throttle, a microphone used to input voice commands, a camera used to input gesture commands, etc. In general, a human-machine interface can be provided for operating the device.

In various embodiments, one or more of the input devices can be coupled directly to the magnetic lifting device, such as a switch on a housing or a mechanical arm coupled to the housing or a throttle on a handle which is attached to an arm coupled to the housing. In another embodiment, a control interface can be provided on an input panel which is separate from the device. The input panel can be coupled to the device 52 via a wireless or wired connection.

In addition, the device 52 can include various mechanisms for measuring an operational state of the device. For example, sensors can be provided which measure an RPM of a motor, a velocity of the magnetic lifting device, a power consumption rate, a remaining battery level, an amount of load carried, a direction, a hover-height, a temperature, etc. Information from the sensors can be output as part of the human machine interface. For example, a video display panel and/or various gauges, such as a temperature gauge, speedometer, tachometers, lighting devices and audio devices can be provided for outputting vehicle state information. Like the input mechanisms, output devices for displaying state information associated with the device 52 can be located on the device, remote from the device or combinations thereof.

In FIG. 3, a bottom surface of the magnetic lifting device 52 starts in a position in contact with an upper surface of the conductive mass. 54 In other embodiments, as shown in FIG. 4, the magnetic lifting device 52 can include one or more mechanisms which provide an initial stand-off height when the system is off. In the example of 60*a*, the magnetic lifting device 52 includes legs, such as 64. In other embodiments, rollerball units or wheels can be utilized instead of or in conjunction with the legs.

In FIG. 4, at rest in 60*a*, the magnetic lifting device rests on legs 64. A stand-off height 62 provided by the legs 64 is less than the equilibrium height 58. When the magnetic lifting device 52 is turned on in 60*b*, the device 52 rises to equilibrium height 58, which is above the initial height 62. In other embodiments, the stand-off height 62, which is provided by a mechanism, such as the legs 64, can be greater than stand-off height 62. For example, the legs 64 can be telescopic such that the length of the legs start are initially greater than the stand-off height 62 and then are shortened to be less than the stand-off height 62.

In the embodiment of FIG. 4, the legs 64 are retractable. Thus, a pivot joint is included which allows the legs to move from a vertical to a horizontal position and back. Other orientations between vertical and horizontal are possible and these positions are provided for the purposes of illustration only. A motor and a control system can be used to control a position of the legs, such as from vertical to horizontal during take-off and from horizontal to vertical for landing. In one embodiment, as described in the previous paragraph, the legs can include a telescopic portion which allows the length of the legs to be adjusted. Using a telescoping mechanism, it may not be necessary to pivot the legs.

In yet another embodiment, the legs, such as 64, can be pulled up into the housing of the magnetic lifting device after take-off. For example, while the legs remain in a horizontal position, the legs can be retracted into the housing of device 52. As another example, the legs, such as 64, can be configured to pivot in the opposite direction as shown in FIG. 4, such that the legs fold up into the housing of the magnetic lifting device 52.

In other embodiments, an initial stand-off distance can be provided which is greater than equilibrium height 58. For example, the length of the legs 64 can be greater than the equilibrium height. The ends of the legs can include wheels. In operation, the magnetic lifting device 52 can be turned on. Then, the legs 64 can be moved outward from their vertical position allowing the lift generator 52 to approach the equilibrium height from above. When the equilibrium height is reached, the magnetic lifting device 52 may remain at the equilibrium height while the legs continue to retract.

In other embodiments, when the magnetic lifting device 52 lifts off, the legs can be configured to fall away or otherwise disengage. For example, the legs can be coupled to the conductive mass 54 or some other substrate in some manner such that the legs are pulled away from the magnetic lifting device 52 as it rises. In another embodiment, the magnetic lifting device 52 can include some mechanism which causes the legs to detach.

In other embodiments, legs or some other stand-off mechanism can be attached to the magnetic lifting device 52 in a fixed orientation. For example, the legs 62 can be fixed in a vertical position. In another embodiment, wheels can be attached to the magnetic lifting device 52. The wheels may allow the magnetic lifting device to be rolled even when the generator is not on.

In some instances, the magnetic lifting device 52 can be configured to support only a portion of the weight of a payload. For example, a payload can be placed on top of the magnetic lifting device 52. The magnetic lifting device 52 can include wheels. When the magnetic lifting device 52 is turned, a portion of the payload weight may be countered while the wheels remain on the ground. The countering of the payload weight allows the payload to be more easily rolled on the wheel and moved to another location.

Figure 5:
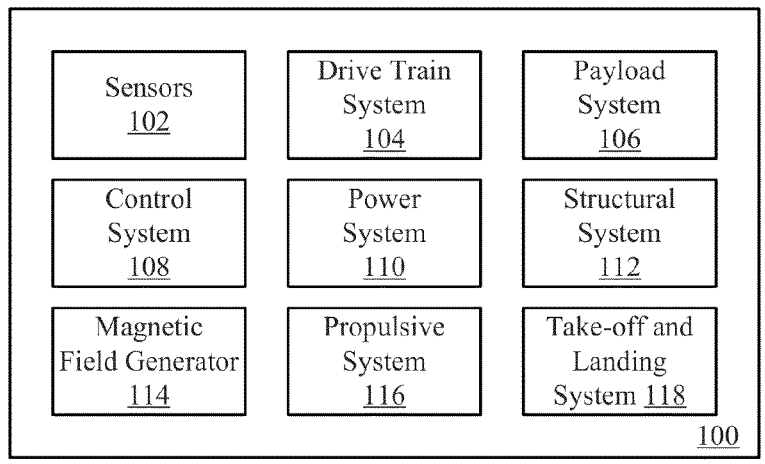
FIG. 5 is a block diagram of a magnetic lifting device in accordance with the described embodiments.

Next, additional details of a magnetic lifting device are described. FIG. 5 is a block diagram of a magnetic lifting device 100 in accordance to some embodiments. The magnetic lifting device 100 can include one or more sensors 102. For example, sensors can be provided which detect a tilt and roll of the device, such as a 3-axis accelerometer. In another example, a sensor can be configured to detect a height of the magnetic lifting device above the ground. The sensors can be placed in multiple locations to provide some indication of the orientation of the magnetic lifting device 100 relative to ground. As described above, the magnetic lifting device may tilt or wobble.

In another example, the magnetic lift system can include sensors for measuring a speed or power output from one or more motors associated with the device. In yet another example, the magnetic lifting device can include one or more temperature sensors at one or more locations. The temperature sensors can be used to detect the temperature of a bottom surface of the magnetic lifting device 100 and/or a temperature of a top surface of the conductive mass as well as temperatures of internal components of the magnetic lifting device 100.

The magnetic lifting device 100 can heat the conductive mass. If the conductive mass gets too hot, it and/or the magnetic lifting device 100 may be damaged. In some instance, the device can be configured to shut or slow down to reduce the heating in response to a temperature reading received from the temperature sensor. In another instance, the magnetic lifting device 100 can be configured to change automatically its position or notify a user to change its position in response to a detection of a high temperature. For instance, the magnetic lifting device may move itself to different location above the conductive mass, which is less hot than its current location.

In another example, an internal cooling mechanism can be triggered, such as fan which changes the airflow over the affected area to reduce the temperature. As will be described in more detail below, the magnetic lifting device 100 can include one or more rotors and mechanisms for driving the rotors. In some embodiments, the rotors can be shaped and/or include components to move air which is used for cooling purposes.

The magnetic lifting device 100 can include a drive train system 104. In one embodiment, the drive train system can be used to move the primary magnetic field. For example, as described above, the motor can be used to turn a disk including one or more permanent magnets. The drive train system 104 can include gears and belts which mechanically coupled the motor to some mechanism which it drives. In one embodiment, the drive train system can be configured to receive mechanical energy from an outside source. For example, the rotors including primary magnets can be attached to pedals or a hand crank which allows a person to input energy which causes the rotors to rotate and hence the primary magnetic field to move.

The magnetic lifting device can include a payload system 106. The payload system 106 can be used to support, secure and/or mechanically couple, a payload to the magnetic lifting device. For example, a payload system may include a platform configured to receive a payload and one or more fasteners which allow the payload to be secured to the platform.

The magnetic lifting device 100 can include a control system 108. The control system 108, which can include a controller, can be programmed to control various aspects of the operation of the magnetic lift system. The controller can have a processor and a memory and be configured to execute programming instructions. For example, the control system 108 can control a power output profile of a motor during take-off and landing. As another example, the magnetic lifting device 100 can include a propulsive system which can be used to affect an orientation or translational position change. The control system 108 can be configured to implement an input orientation or translational position change using the propulsive system.

In one embodiment, the device 100 can include mechanisms for adjusting its pitch and tilt during flight. For example, the device 100 can include one or more gyroscopes and sensors for measuring an orientation of the device relative to some reference plane. In another example, mechanisms can be provided for adjusting the pitch and/or tilt of individual rotating elements, such as the pitch and/or tilt of a rotating shaft coupled to a magnetic array where both are moved in unison or the pitch and/or of just the rotating magnetic array. The pitch or tilt of the individual rotating elements can be adjusted to change a pitch or tilt of device 100. The control system 108 can be configured to operate the pitch and tilt mechanisms using sensor data, such that some desired orientation of the device 100 is maintained, such as relatively parallel to the plane of the conductive mass over which it is hovering or moving or relative to a reference plane perpendicular to the direction of gravity.

The magnetic lifting device 100 can include a power system 110. The power system can be used to drive on-board systems, such as a motor. In one embodiment, the power system can include an energy storage mechanism, such as one or more batteries. In other embodiments, the power system 110 can be configured to receive power from an outside source. For instance, the magnetic lift system can include a plug for receiving power from an AC power source and voltage conditioning circuitry for converting the AC power to one or more DC voltages. In yet other embodiments, the power system can include a combustion engine and associated fuel tank for holding a combustible fuel. The combustion engine can be coupled to an electric generator to generate electricity.

In one embodiment, the system can utilize regenerative braking, which deposits energy into an energy storage mechanism. For example, the angular momentum of a spinning disk including the primary magnets can be transferred to a motor. The spinning disk can drive the motor so that it acts as a generator. Electricity generated from the motor can be used to charge a battery. The battery can then later be used to drive the motor which spins up the disk including the primary magnets.

The magnetic lifting device 100 can include a structural system 112. The structural system can include a housing and support members for structurally linking the various components of the device. Further, structural system 112 can include shielding or dampening components. For example, the shielding may include insulation for reducing noise, preventing the propagation of thermal energy or the propagation of magnetic energy. For example, magnetic shielding may be used to shield a payload or on-board electronics from the eddy current effects that are generated. Mu-metal is one example of a material which can be used for magnetic shielding purposes.

In addition, the structural system 112 can include components for reducing vibrations and stiffening the structure. Further, the structural system can include thermal management components, such as heat sinks or fans, for cooling or transferring thermal energy away or towards various locations. For example, components can be provided for transporting heat generated by the motor to another location.

The magnetic lift device 100 can include a magnetic field generator 114. In one embodiment, the magnetic field generator can be one or more permanent magnets, such as neodymium magnets. In some embodiments, Neodymium (NdFeB) N40 strength permanent magnets are used. The system can be constructed using magnets of varying strengths depending on loading requirements. For example, N52 magnets provide for greater magnetic field strength.

In another embodiment, the magnetic field can be generated by electromagnets where the magnetic field is generated by the movement of current through a conductor, such as a wire. In the case of permanent magnets, another mechanism can be employed to move the magnets and generate a moving magnet field. With electromagnet configuration, current can be supplied to different locations over time to generate the moving magnetic field or the electromagnets can be physically moved by another mechanism like the permanent magnets.

The magnetic lifting device 100 can include a propulsive system 116. A propulsive system 116 can be provided to change an orientation or translational position of the magnetic lifting device. For example, gyroscopes can be provided to rotate the magnetic lifting device around one or more axis. As another example, a fan can be provided for generating propulsive force, like an airboat.

In another example, mechanisms can be provided which are configured to cause the magnetic lifting device to tilt in a particular direction such that a portion of the magnetic lifting device is at least temporarily at height closer to the conductive mass and a portion is farther away from the conductive mass. The height imbalance can cause a force imbalance which can cause a translational force to be generated in particular direction.

In another example, the movement of the magnetic field and/or the strength of magnetic field can be varied locally. For example, the magnetic field can be partially shielded to reduce its strength at a particular location. As another example, a plurality of rotating disks with magnetic arrays can be used (e.g., see FIG. 14 or 17-20) where the rotational disks are driven at different velocities. Local imbalances in the strength of the primary magnetic field and/or the rate of movement of the magnetic field can be used to generate forces which impart a translation velocity to the magnetic lifting device.

Finally, as described above with respect to FIG. 4, the magnetic lifting device 100 can include a take-off and landing system 118. The take-off and landing system 118 can include supports, such as legs, wheels or transfer ball units, which carry all or some of the weight of the magnetic lifting device at rest. In one embodiment, the supports can be adjustable such that an orientation of the supports can change depending on a state of the magnetic lifting device. For example, as shown in FIG. 4, supports can be in a vertical position for take-off and landing and then in a horizontal position while the magnetic lifting device is hovering.

Figure 6:
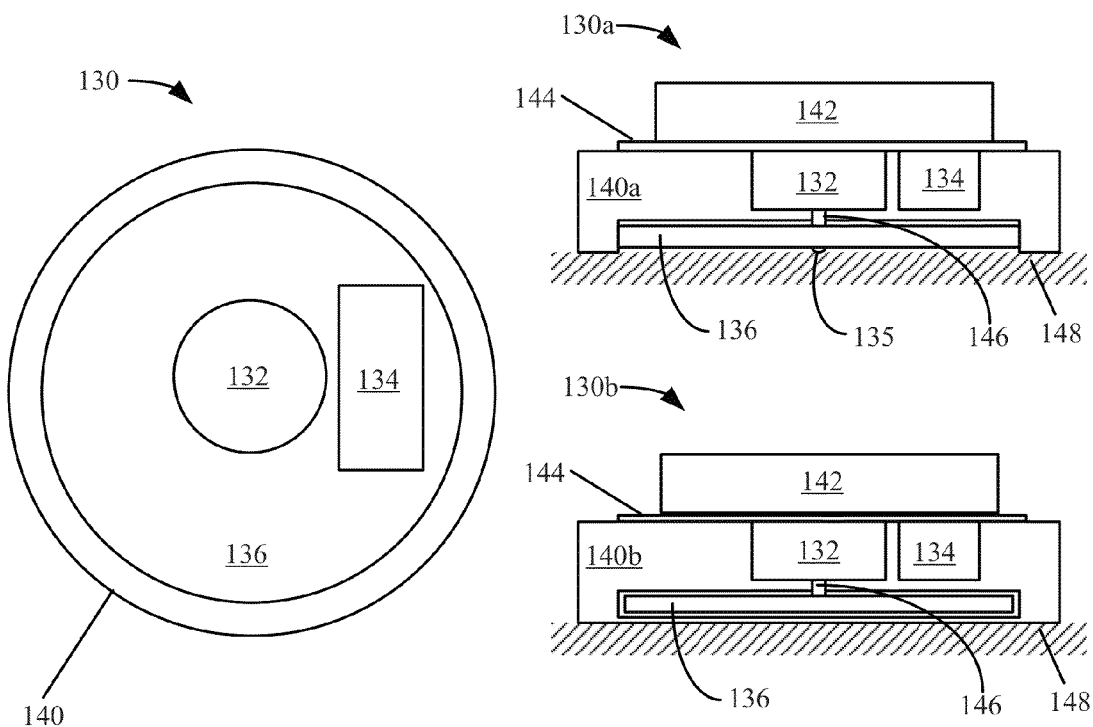
FIG. 6 is an illustration of a magnetic lifting device using a rotating magnetic field in accordance with the described embodiments.

Next, an example of a magnetic lifting device using a rotor with an arrangement of permanent magnets is described. FIG. 6 shows a magnetic lifting device 130 with two different configurations, 130a and 130b. The rotor 136 is circular. A motor 132 is coupled to a central axis of the rotor 136. Rotational energy is transmitted from the motor 132 to the rotor via shaft 146. The rotor includes an arrangement of permanent magnets (not shown). Details of a motor and rotor coupling are described as follows with respect to FIG. 6. Details of magnet configurations for used on a rotor are described with respect to FIGS. 7 and 10.

Figure 8:
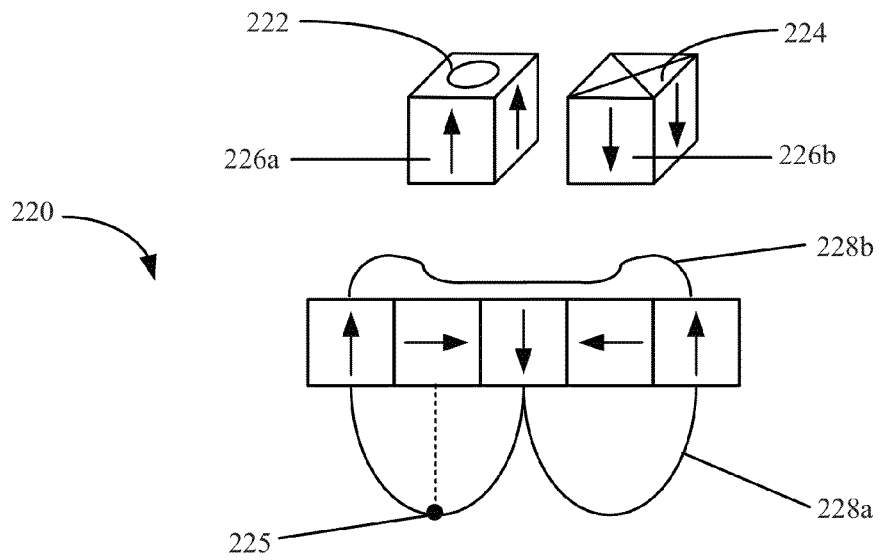
FIG. 8 is an illustration of an arrangement of permanent magnets used to concentrate the magnetic field in a particular direction in accordance with the described embodiments.

The motor 132 can be configured to receive power from an energy storage device 134 or a fuel for generating power, such as a combustible fuel or a fuel used in a fuel cell used to generate electricity. In one embodiment, the energy storage device can include one or more batteries. A housing 140 can surround and at least partially encloses the motor 132, the rotor 136 and the power source 132. A payload platform 144 on top of the device 130 is configured to receive a payload 142. The payload platform 144 can include one or more attachment points for fasteners and/or structures, such as raised walls, which secure the payload 142 to the platform and possibly prevent it from shifting positions on the platform. The foot print of the platform shown in FIG. 8 is for illustrative purposes only as platforms with a smaller or larger footprint can be utilized on the devices described herein.

In one embodiment, the housing 140a surrounds but doesn't totally enclose the rotor 136. When the system is off or prior to achieving sufficient magnetic lift for the device 130a to hover, a bottom surface of the housing 140a, which can be a circular ring, rests on a conductive mass 148. A spacer, such as a spherically shaped bearing 135 can be placed at the center axis of the rotor 136. In other embodiments, multiple bearings at different locations on the rotor can be used. For example, transfer ball units which allow for static take offs and controlled landings can be utilized.

The rotor 136 is raised slightly above a top surface of the conductive mass 148. The bearing 135 can help prevent the rotor 136 from contacting a top surface conductive mass 148 during takeoff or landing. The spherical shape can minimize contact of the bearing on the surface 148 to reduce rotational drag and friction heating.

In another embodiment, the rotor 130 is completely enclosed in the housing 140b. A bottom surface of the housing 140b rests on the conductive mass 148. The housing 140b and associated structure can include stiffeners and other support structures to minimize movement of the shaft 146 relative to the housing 140b and prevent the rotor 136 from contacting an interior of the housing while it is rotating. In addition, bearings may be utilized to ensure a minimum spacing is maintained between the rotor 136 and the housing 140b. In operation, the rotor 136 can be spun up by the motor and the device 130 and payload 142 can hover above the conductive mass at some time averaged height.

Mechanisms for Generating a Moving Magnetic Field

Figure 7:
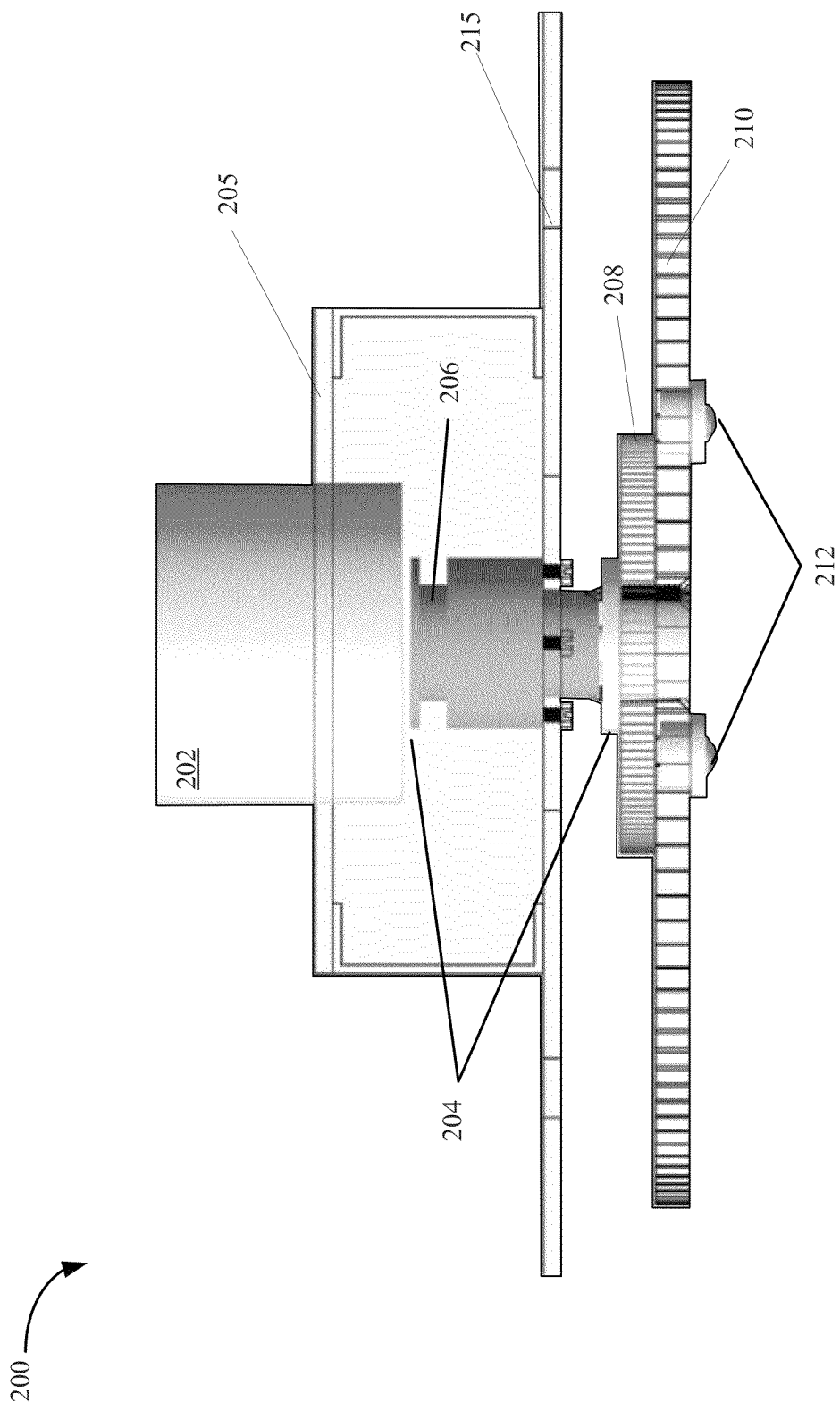
FIG. 7 is an illustration of components for generating a rotating magnetic field in accordance with the described embodiments.

Next details of a motor and rotor coupling used to generate a moving magnetic field are described with respect to FIG. 7. The rotor is configured to hold an arrangement of permanent magnets. Thus, a moving magnetic field is generated when the rotor is rotated with the motor. The rotor can include a substrate for receiving an arrangement of magnets. The rotor substrate including its shape, arrangements of magnets for the substrate and an assembly process for the rotor are described in more detail with respect to FIGS. 8-11. With respect to FIGS. 12a and 12b, a having a variable magnetic field distribution is shown. Finally, with respect to FIG. 13, rotor stack where each rotor generates a moving magnetic field is described.

FIG. 7 is an illustration of components 200 including a motor 202 and a disk 210 for generating a rotating magnetic field. The motor 202 and disk are coupled, via an inline gear box, to a shaft 206. The motor 202 can be configured to rotate the disk 210 at a specified revolutions per minute (RPM)s where the RPMs are controllable. Rotation rates of thousands of RPMs can be utilized in configurations during operation.

In some embodiments, the motor is cylindrically shaped. The height of the cylinder may vary depending on the motor design. A portion of the motor extends through upper housing 205. A portion of the shaft extends through a lower housing 215 which is coupled to the upper housing 205.

In one embodiment, the motor 202 can be a brushless, direct current (DC) motor. Further, the motor 202 can have a power rating of 10,000 Watts with a rotational velocity output of 167 revolutions per minute per volt of DC current applied. Depending on the application, different motors, such as motors with a different power outputs and a different form factors, can be used and the example above is provided for the purposes of illustration only.

The shaft 206 includes mounting plates 204 for coupling the motor 202 to the shaft 206 and the rotatable disk 210. In one embodiment, the shaft 206 is directly coupled to a shaft of the motor (not shown). In another embodiment, the shaft 206 can be coupled to the shaft of the motor via a mechanism, such as a clutch. In 200, the shaft 206 is coupled to the disk 210 via mounting plate 208. Fasteners can be used to secure the disk 210 and mounting plate assembly. Casters 212 which include a protruding hemisphere can provide an initial stand-off distance which can reduce the frictional resistance when the disk 210 is spun up from a stationary state.

In FIG. 7, the orientation of the disk 210, shaft 206 and motor 202 relative to one another is fixed. In other embodiments, the assembly 200 can include one or more joints which the orientation of one or more of these parts relative to one another to be changed. For example, a joint with some number of degrees of freedom near the interface between motor 202 and shaft 206 can allow the angle of the shaft 206 and the disk 210 to change relative to the motor 202. In another example, a joint with some number of degrees of freedom near the interface between the disk 210 and the shaft 206 can allow the orientation of the disk relative to the shaft 206 to change. One or more actuators can be provided to affect an orientation change between these parts. In yet another example, the structure surrounding assembly 200 can include a mechanism which allows the entire assembly to pivot in some manner relative to the surrounding structure.

A change in the orientation between the components 202, 206 and 210 can cause eddy currents of unequal strength to be generated in a conductive mass adjacent to disk 210. In one embodiment, the imbalance in the eddy currents, which is generated, can be used to generate a translation force to propel a magnetic lifting device in a particular horizontal direction while the magnetic lifting device is hovering at a particular height. Next details of a configuration of magnets for generating a primary magnetic field are discussed with respect to FIGS. 8 and 9.

In one embodiment, a primary magnetic field can be generated from an arrangement of rectangular box shaped permanent magnets, such as Neodymium magnets. However, other shapes can be utilized and the rectangular is provided as an example because it is a shape which is commonly available. For example, in one embodiment, custom wedge shaped magnets can be utilized.

A nomenclature can be used to describe an orientation of the magnetic field flux lines associated with each magnet. As shown in FIG. 7, a direction of the magnetic field flux lines associated with each magnet can be indicated by an arrow, such as an up arrow 226a and a down arrow 226. The poles of magnets can be indicated by an "X" symbol 222, representing the bottom of an arrow or the south pole, and a circle symbol 224, representing the point of the arrow or the north pole.

For single permanent magnet, the magnetic field flux lines pass through the poles and are generally symmetric above and below each pole. When an array of permanent magnets are arranged relative to one another, the magnetic field flux lines can be biased in a particular direction for some arrangements and hence the magnetic field flux lines can be denser and the magnetic field strength can be stronger in a particular direction as compared to another direction. This effect can be used to approximate a monopole magnet. One example of such an arrangement of magnets for biasing the direction of a magnetic field flux lines, which can be utilized herein in various embodiments, can be referred to as a Halbach array. In one embodiment, this effect may be amplified by using a high permeability material (like mu metal) in which the reduced magnetic field lines (228b) is further reduced and concentrated or focused to amplify the strength and area of the desired magnetic field 228a. This would allow for increased levitation height and or payload.

For inducing a secondary magnetic field in a conductor substrate via an eddy current effect, it is desirable to have the magnetic field flux lines biased as much as possible in a direction towards the conductive substrate. In 220, an arrangement of five magnets is shown where the magnetic field flux lines 228a are larger beneath the arrangement 220 as compared to the magnetic flux field lines 228b above the arrangement. When used in a magnetic lifting device, which is designed to rest on a conductive substrate, it is desirable to have the magnetic field strongest beneath the arrangement of magnets 220.

Figure 9:
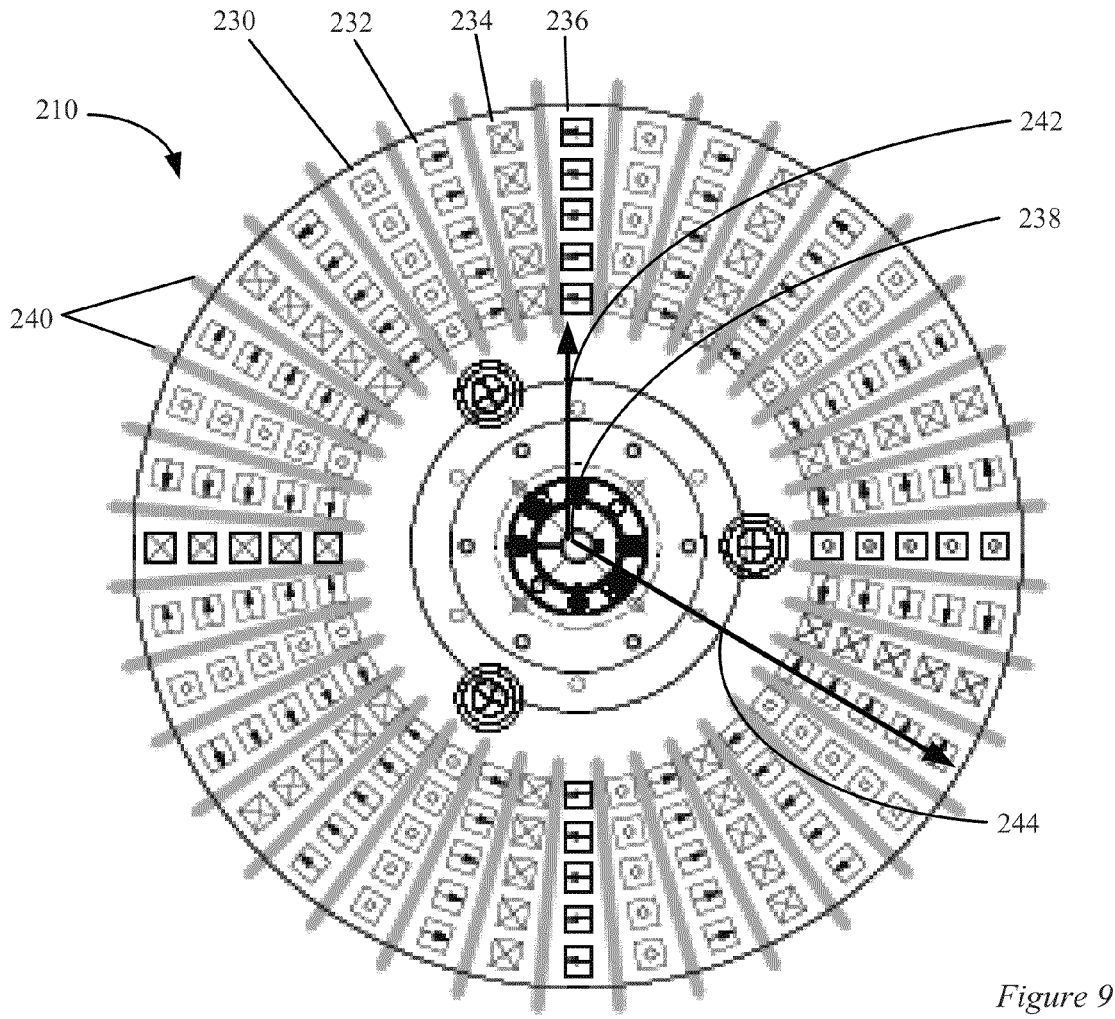
FIG. 9 is an illustration of a circular disk including an arrangement of permanent magnets in accordance with the described embodiments.
Figure 10:
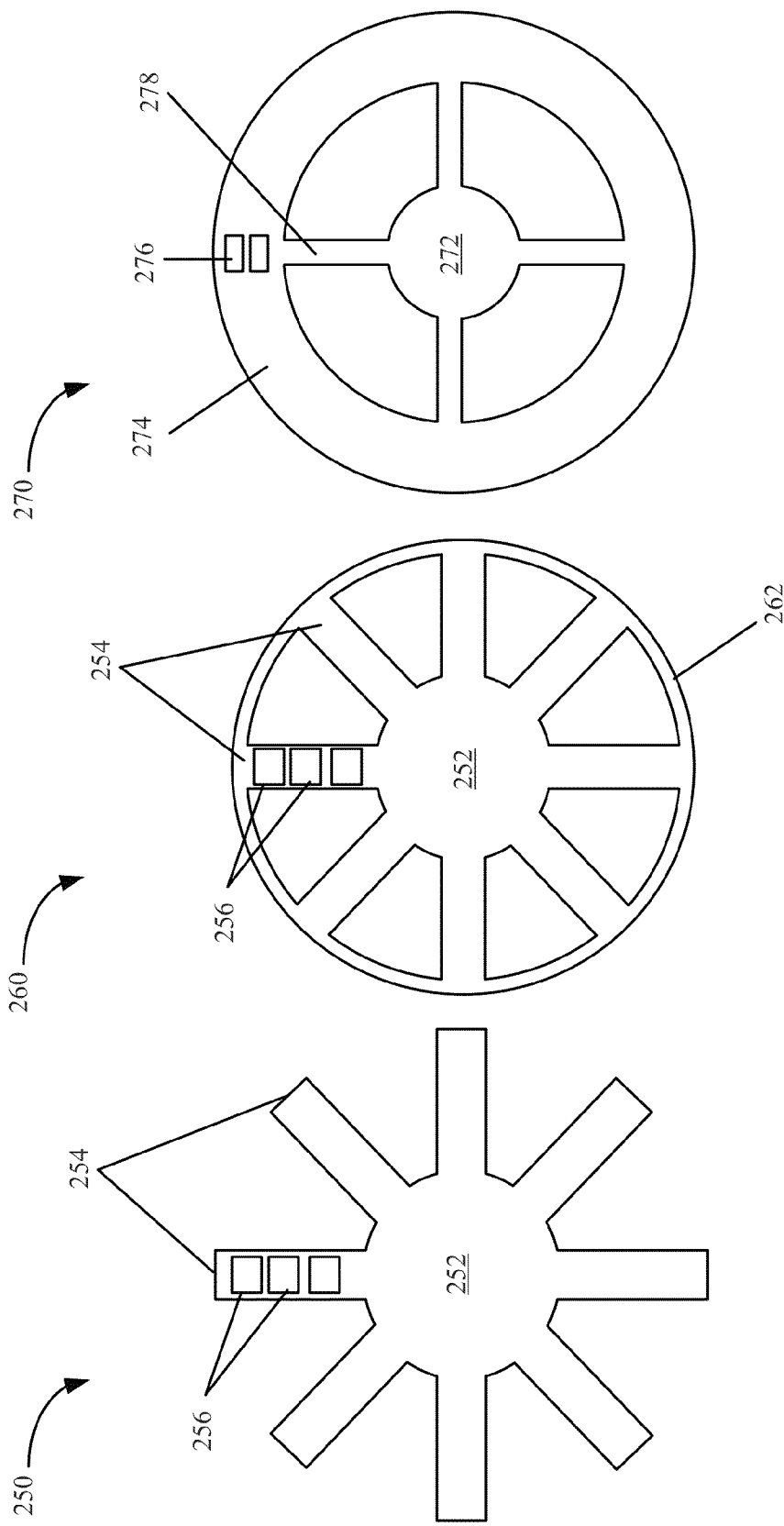
FIG. 10 is an illustration of three different disk substrates for carrying arrays of permanent magnets in accordance with the described embodiments.

FIG. 9 is a circular disk 210 including an arrangement of permanent magnets in accordance with the described embodiments. The magnets are arranged on a circular disk 210. As described above with respect to FIG. 7, the disk 210 can be coupled to a motor. The motor supplies the rotational forces to rotate the disk 210 including the magnets and hence generate a moving magnetic field used for magnetic lifting purposes.

In one embodiment, the magnets are arranged on a disk 210 along lines radially extending from a center axis of the disk 210. The magnet arrangement begins at a first radial distance 242 from the center axis and extends to a second radial distance 244 near an edge of the disk 210. Within the first radial distance 242, the disk 210 includes various structures and apertures for securing the disk to a shaft as shown in FIG. 7.

Radial lines 240 are shown between the magnets. The radial lines 240 represent locations where the magnetic field flux lines are at a maximum. As an example, in FIG. 8, the maximum value of the magnetic field flux lines occurs at location 225. Perpendicular to the radial lines 240, the strength of the magnetic field flux lines decreases. This effect is also shown in FIG. 8. A similar magnetic field flux line distribution is also described below with respect to FIG. 12a.

The first radial distance 240 and the second radial distance 244 are variable and the example of FIG. 9 is provided for the purposes of illustration and is not meant to be limiting. For example, in other embodiments, the second radial distance 244, which marks an outer radius of the magnet array, may not extend as close to the edge of the disk 210. Further, the magnet array may extend closer to the center axis 238 of the disk.

In FIG. 9, the magnets are arranged along thirty six radial lines. The magnetic orientation along each line is constant. For example, an up orientation is shown along line 230, a right orientation is shown along line 232, a down orientation is shown along line 234 and a left orientation is shown along line 236. Five concentric rings are shown. More or less rings can be utilized and five rings are provided for the purposes of illustration only.

The up, right, down, left orientation is repeated around the disk 210. The thirty six radial lines allow for the pattern to be repeated nine times. In some embodiments, the number of radial lines may be a multiple of the number of magnet orientation in a pattern, such as two, three, four, five, six, seven, eight, nine, etc. In the example of FIG. 9, the pattern length is four and the multiple is nine. Thus, thirty six radial lines are provided. In other embodiments, the number of magnet orientations in a pattern can be different. For example, a repeating pattern of three magnet orientations can be used or a repeating pattern of five magnet orientations can be used.

In various embodiments, the magnets on disk 210 can be touching. Using magnets with custom sizes may allow the magnets to be more closely configured. In other embodiments, the magnets may be separated via some mechanism. A spacing mechanism between the magnets may be used to simplify the assembly process.

In the example of FIG. 9, the repeating patterns are arranged from ring to ring such that the orientation along each radial line is constant. In other embodiments, the same pattern can be used for each ring but the pattern can be shifted from ring to ring such that the orientations don't line up along the radial lines. In other embodiments, the repeating pattern may not be the same for each ring. For example, a repeating pattern of three magnet orientations can be used for a first ring, a repeating pattern of four magnet of orientations can be used for a second ring and a repeating pattern of six magnet orientations can be used for a third ring.

In FIG. 9, five concentric rings are used. In other embodiments, more or less than five concentric rings can be used. Other patterns, which don't involve concentric rings, are possible and the example of rings is provided for the purposes of illustration only. For example, a two by two, three by three, four by four, five by five, etc. planar (2-D) array of magnets might be utilized where the array pattern is repeated a number of times around the disk (e.g., five repetitions of five by five arrays of magnets can be arranged circumferentially around the disk 210) In general, any grouping of magnets including two or more magnets can be arranged circumferentially around the disk a number of times. In addition, 3-D arrangements of dipole magnets can be utilized.

In one embodiment, the permanent magnets can be cubic shaped and equally sized. In other embodiments, different sized magnets can be used. For example, smaller magnets can be used closer to the axis and larger magnets can be used away from the axis. Further, the number of magnets in each ring can vary from ring to ring. For example, thirty six magnets might be used in the inner most ring but forty magnets can be used in the outer most ring.

In the example of FIG. 9, the pattern of magnet orientations provides for a magnetic flux line pattern which is denser on one side of the disk. Further, the magnetic flux is small between each concentric circle. A measure of the efficiency of an arrangement of magnets can be characterized as an amount of magnetic lift generated relative to the weight of the magnets which are used. Arrangements which generate more magnetic lift per weight of the magnets employed to generate the magnetic field can be considered more efficient than arrangements of a similar weight which generate less magnetic lift.

In particular embodiments, arrangements which provide an amount of magnetic lift to weight of the magnets of at least ten have been achieved (e.g., ten pounds of magnets generate at least one hundred pounds of lift). The ratio can be defined at some point at operation, such as when the magnets are moving at some threshold velocity or greater, because when the magnetic field is at rest the amount of magnetic lift may be zero as no eddy current are generated. The maximum payload which a magnetic lifting device can lift off the ground may be approximately the maximum magnetic lift weight minus the weight of the magnetic lifting device.

The maximum magnetic lift weight can be determined as the weight of the magnets times the magnetic lift to weight of the magnets ratio where a value of this ratio can vary depending on the arrangement of the magnets which are used, the material properties of the magnets, such as density, and the inherent strength of the magnets. In one embodiment, the magnetic lift to weight of the magnets ratio may be determined by weighing the magnetic lifting device, weighing the magnets it utilizes and then while the magnetic lifting device is operating, loading it with weight until it is no longer capable of hovering in place to determine the maximum magnetic lift weight.

In other embodiments, device configurations and magnet arrangements which provide an amount of magnetic lift to weight of the magnets of at least fifteen or more have been achieved. In yet other embodiments, device configurations and magnet arrangements which provide an amount of magnetic lift to a weight of the magnets of at least twenty or more have been achieved. In further embodiments, device configurations and arrangements which provide an amount of magnetic lift to weight of the magnets of at least twenty or more have been achieved. In additional embodiments, device configurations and arrangements which provide an amount of magnetic lift to weight of the magnets of at least twenty five or more have been achieved. In additional embodiments, device configurations and arrangements which provide an amount of magnetic lift to weight of the magnets of at least thirty or more have been achieved.

Figure 18:
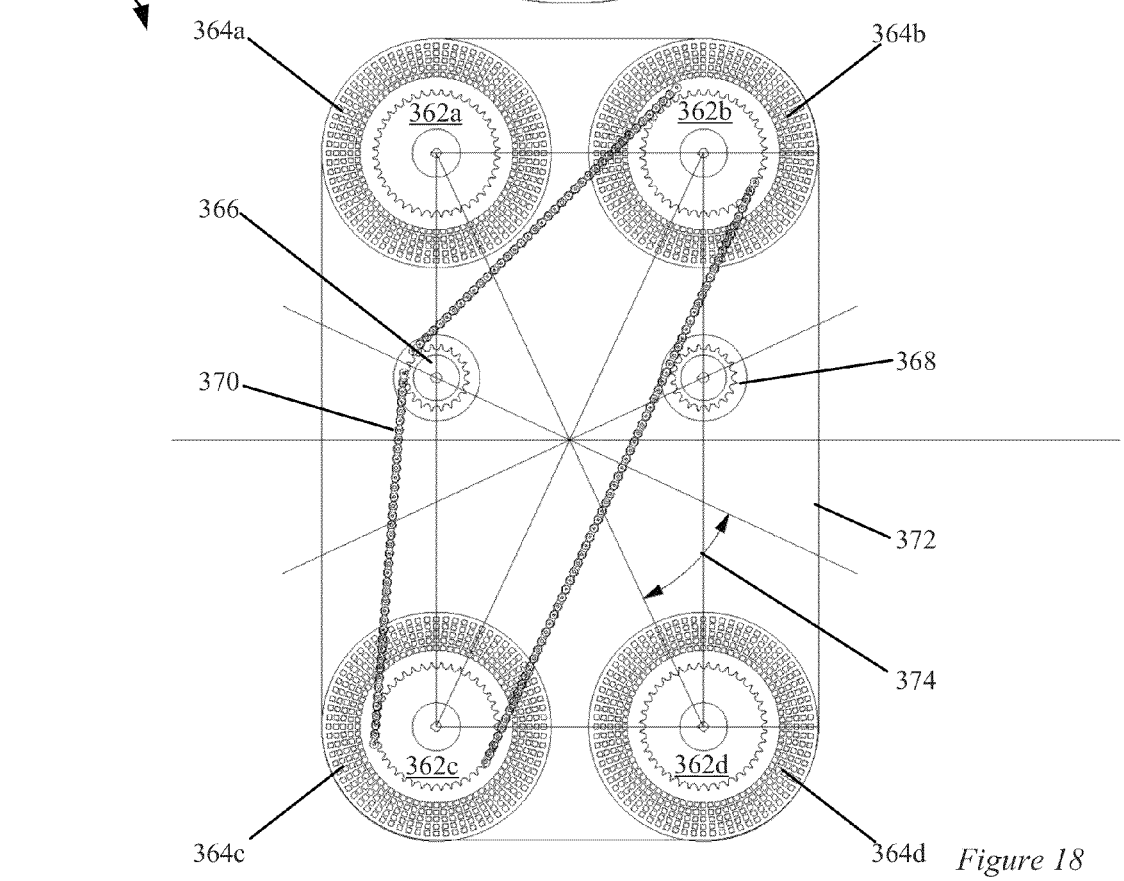

Next, details of rotatable disk configurations for receiving an arrangement of magnets are described. FIG. 18 is an illustration of three different disk substrates, 250, 260 and 270, for carrying arrays of permanent magnets. In general, a rotatable disk can be any shape. However, it is desirable that the disk is balanced to minimize vibrations during rotations. Further, the disks can be solid, such as shown in FIG. 9, or can include one or more portions removed as shown in 250, 260 and 270.

In 250, the rotatable configuration 250 includes a hub portion 252 and a number of arms, such as 254, extending from the arms. In 260, the arms are joined near their tips via edge portion 262. The edge portion 262 can be to added increase the overall strength of the disk and/or lessen vibrations associated with the arms.

As compared to a solid disk or in general a solid substrate, a substrate with portions removed can be lighter and have a lower moment of inertia. The lighter weight can result in increased payload weight because the weight of the disks can be used instead for payload. Further, a smaller and less powerful motor may be utilized to drive a substrate with a lower moment of inertia, which may also reduce the weight and increase a payload weight. In addition, a smaller and less powerful motor may draw less power. Thus, when a battery is used to power the motor, the battery life can be extended for a given size battery or a smaller weight battery may be utilized as the power draw of the motor is decreased.

In general, it may be desirable to minimize a weight of the magnetic lifting device and many such weight tradeoffs are possible and not limited to these examples. For instance, a placement of the magnets towards an edge of the disk, which increases the moment of inertia, can be balanced against the effectiveness of the disk under rotation to generate magnetic lift. If placing the magnets near the edge increases the magnetic lift, it may desirable to use this configuration even though the moment of inertia is increased. Whereas, if the moment of inertia effect leads to using a larger motor to drive the disk and the amount of magnetic lift which is generated is not substantially increased in this configuration, it may be desirable to use a smaller radius disk, with a lower moment of inertia or to arrange the magnets closer to the axis of rotation on a larger disk.

An array of three magnets is shown arranged along one of the arms. In one embodiment, a group of magnets can be arranged along radial lines to form a magnetic field which is biased in a particular direction, such as weaker above the disk 250 and stronger below the disk 250. For example, magnets 256 can be arranged in a Halbach array in the radial direction to bias the magnetic field in this manner.

As described above, multiple magnets can be arranged to bias a direction of the resultant magnetic field, via an arrangement in the circumferential direction. When the arms, such as 254, are spaced close enough, magnets on adjacent arms can be arranged to cause the biasing effect via interactions between magnets on different arms. However, in other embodiments, the distance between arms can be selected to limit interactions between magnets arranged on each arm.

Figure 12A:
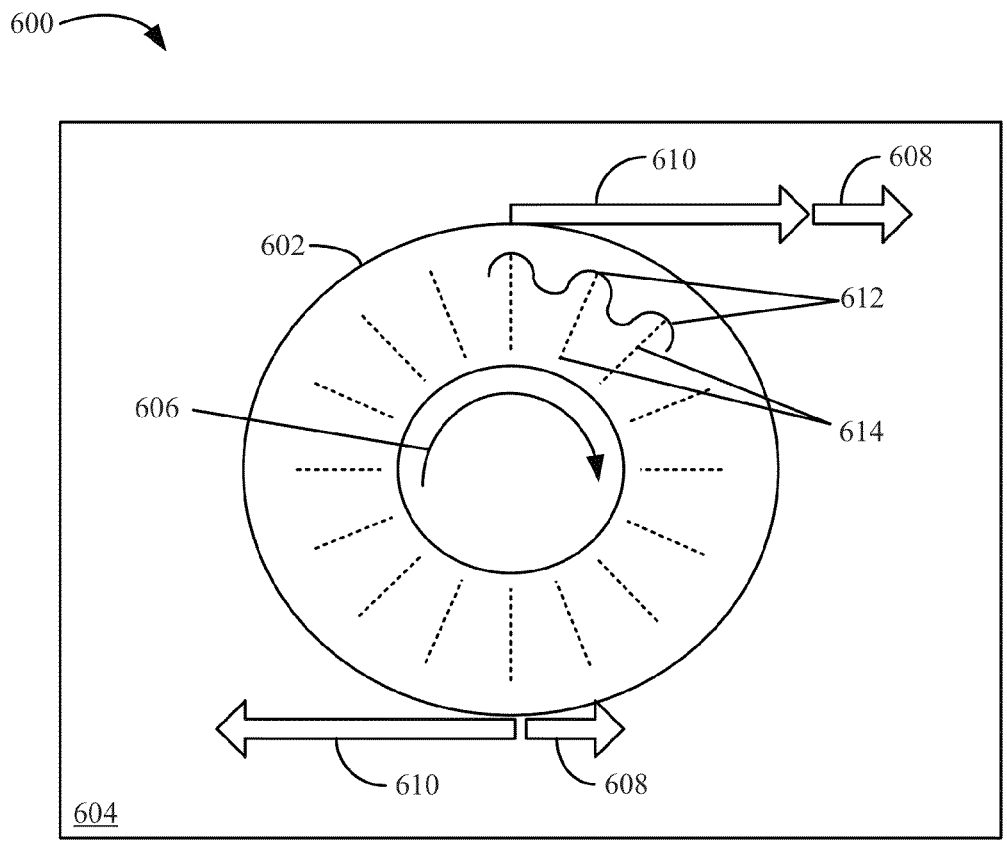
FIGS. 12a and 12b are an illustration of a circular disk configured to generate multiple magnetic field configurations in accordance with the described embodiments.

In this configuration (i.e., when interaction between the arms is limited), the magnetic field flux lines can be aligned such that the strength rises and drops in the axial direction. In the circumferential direction, rings of somewhat constant strength magnetic field flux lines can be formed (see FIG. 12B for a similar configuration). In FIGS. 9 and 12A, magnetic field flux lines of a somewhat constant strength are formed in the radial direction and in the circumferential direction at a constant radius, a pattern of repeating peaks where the strength rises and drops between each radial line is formed.

In other embodiments, magnets can be arranged to produce a magnetic field direction biasing effect via arrangements in both the circumferential direction and the radial direction. For example, magnets, such as 276, can be arranged in a Halbach array in the circumferential direction. In addition, magnets can be arranged along the arms, such as 278, in a radial direction, to generate a magnetic biasing effect.

In one embodiment, a pivoting joint can be placed between the hub 252 and one or more of the arms, such as 254. The pivoting joint may allow the arms to rotate and change a direction of the magnetic field of the magnets arranged along the arms. This effect may be used to moderate the strength of the magnetic field projected downwards to control a hover height of magnetic lift vehicle. For example, a rotation of the arms, such as 254, can cause a magnetic lift vehicle in free flight to hover at different heights.

In another embodiment, a mechanism can be provided which allows the arms, such as 254, to slide around the circumference of the hub 252. Thus, in one configuration, the arms, 254, can be equally distributed around the hub 252. Whereas, in another configuration, the spacing between the arms can vary in some manner.

In particular embodiments, portions of a disk substrate, such as arms 254, can be aerodynamically shaped. The shape can be selected to reduce aerodynamic drag associated with the disk substrate. A lower aerodynamic drag can reduce an amount of power needed to drive the disk at a particular velocity. The aerodynamic drag increases non-linearly with the rotational velocity. Thus, drag versus a needed rotational velocity to generate an amount of magnetic lift is one tradeoff which can be considered in designing a magnetic lifting device with rotors.

In various embodiments, a disk substrate for holding the magnets can be formed from different materials. In one embodiment, the disk can be formed from a polycarbonate plastic. In other embodiments, the disk can be formed from a metallic material. In yet other embodiments, the disk can be formed from a composite material, such as a carbon composite.

A substrate formed from one of the materials above can include apertures or slots for holding an arrangement of magnets, such as square slots for holding cubic shaped magnets. A manufacturing process can involve forming the disk and then placing magnets in the substrate. The magnets can be placed singly or in pre-arranged groups depending on how the apertures or slots are formed. For example, apertures may be formed for holding a single permanent magnet or for holding two or more magnets in contact with one another.

In one embodiment, the magnets can be bonded to the substrate in some manner, such as via use of a bonding agent (e.g., glue). In another embodiment, disk structure can be disposed between two magnets in locations where the magnets are strongly attracted to one another. The attractive force between the magnets can exert a force on the substrate between the magnets and hence hold the magnets in the substrate. In yet other embodiments, a combination of magnetic attraction and a bonding agent in the substrate can be used to hold the magnets in place.

In an additional embodiment, the magnets can be sealed within a substrate. For example, a substrate core can be formed, such as a disk with apertures for receiving the magnets. The magnets can be placed in the core in a desired arrangement. Then, a layer can be formed over the top and bottom of the substrate cover to seal the magnets in the core. For instance, a material can be deposited onto the top and bottom of a circular shaped disk substrate or two circular covers can be bonded to each side of the disk substrate to seal the magnets in the core of the substrate. In another embodiment, the substrate can include depressions configured to receive magnets. The magnets can be placed in the depressions and then, a layer can be deposited or a cover can be placed over the magnets after they are arranged in the depressions.

Figure 11:
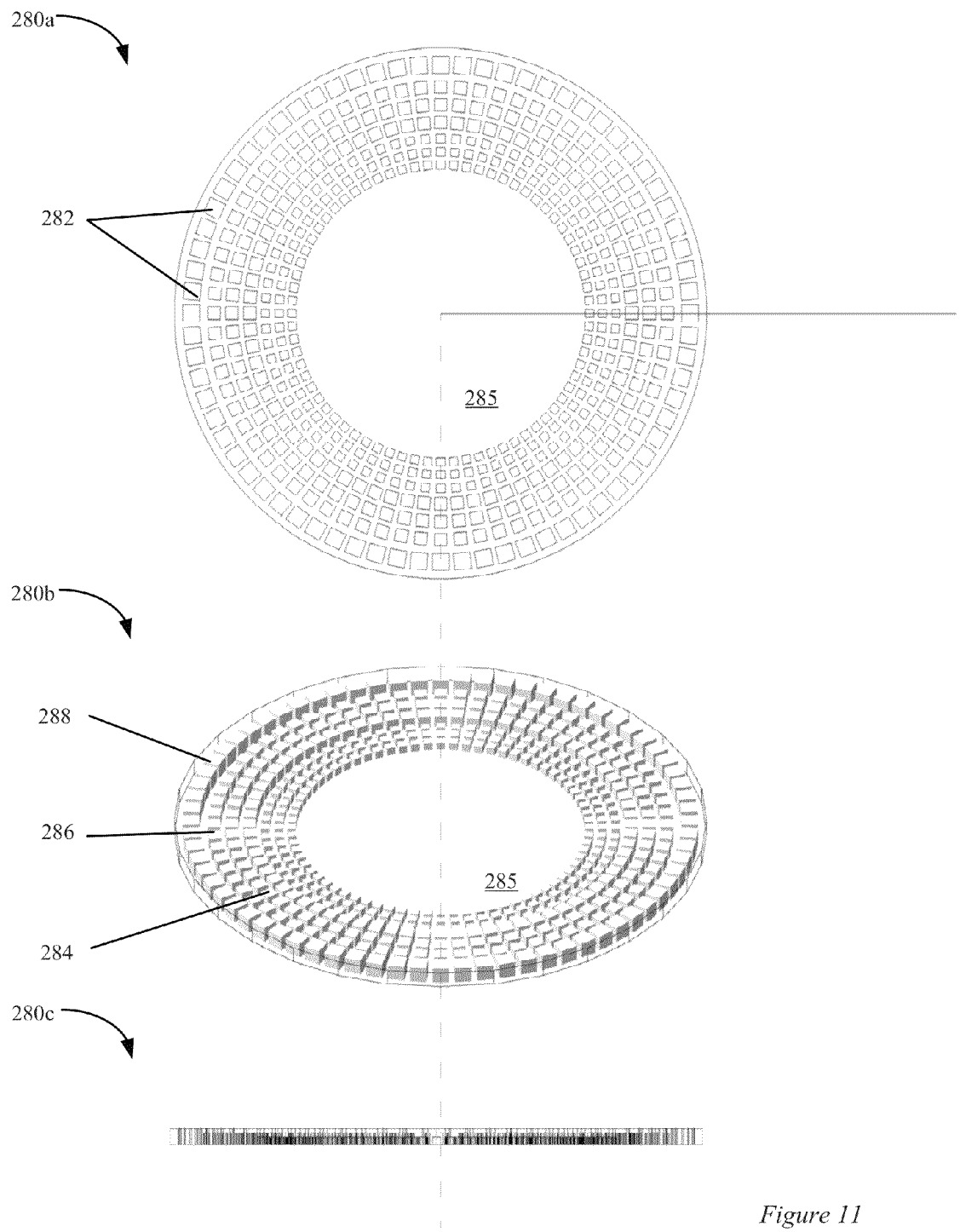
FIG. 11 is an illustration of a top, a perspective, and a side view of a rotatable disk with a non-planar arrangement of magnets in accordance with the described embodiments.

Next, non-planar substrates are described. FIG. 11 is an illustration of a top 280*a*, a perspective 280*b*, and a side view 280*c* of a rotatable substrate 285 with a non-planar arrangement of magnets in accordance with the described embodiments. As described above, the rotatable substrate can be assembled with array of permanent magnets. The array can be rotated to generate a moving magnetic field, which is used to generate magnetic lift.

In 280*a*, the magnets, such as 282, are shown arranged in a number of circles of increasing diameter. The magnet size increases from the inner circle to the edge. In one embodiment, the directions of the dipole magnets are arranged relative in the circumferential direction to bias the strength of the magnetic field in a particular direction, such as weaker on a top side of the substrate 285 and stronger on a bottom side of the substrate 285.

As shown in 280*b* and 280*c*, the substrate 285 is substantially flat on the bottom. The substrate 285 includes a portion where the thickness increases from an inner radius to an outer radius. In particular, a number of steps are formed in the substrate where the height of the steps increases. Thus, the size of the circular rows including the magnets, such as 284, 286 and 288, increases in height as the edge is approached. This effect can be also achieved or enhanced using magnets with greater heights in the outer rows versus the inner rows. For example, rather than steps, magnets with the largest height can be placed on the outer row and then magnets with increasingly smaller heights can be placed on rows moving toward a center axis of the disk.

In the example of FIG. 11, as shown in 280*c*, a bottom side of the substrate 285 is flat. In other embodiments, the bottom can be curved. For example, a bottom of the substrate 285 can be bowl shaped and curve upwards from the center axis to the outer edge. The amount of curvature can be varied to produce a relatively shallow bowl or a deeper bowl. In another embodiment, the substrate can be arranged in a spherical shape. In yet another embodiment, the substrate can be arranged in a cylindrical shape where magnets are arranged around all or a portion of the circumference of the curved portion, a top surface and/or a bottom surface of the cylinder. In one embodiment, a cylindrically shaped configuration can be rotated about a center axis running through a top flat portion of the cylinder to a bottom flat portion of the cylinder. Many different shapes are possible and these are provided for the purposes of illustration only and are not meant to be limiting.

Figure 12B:
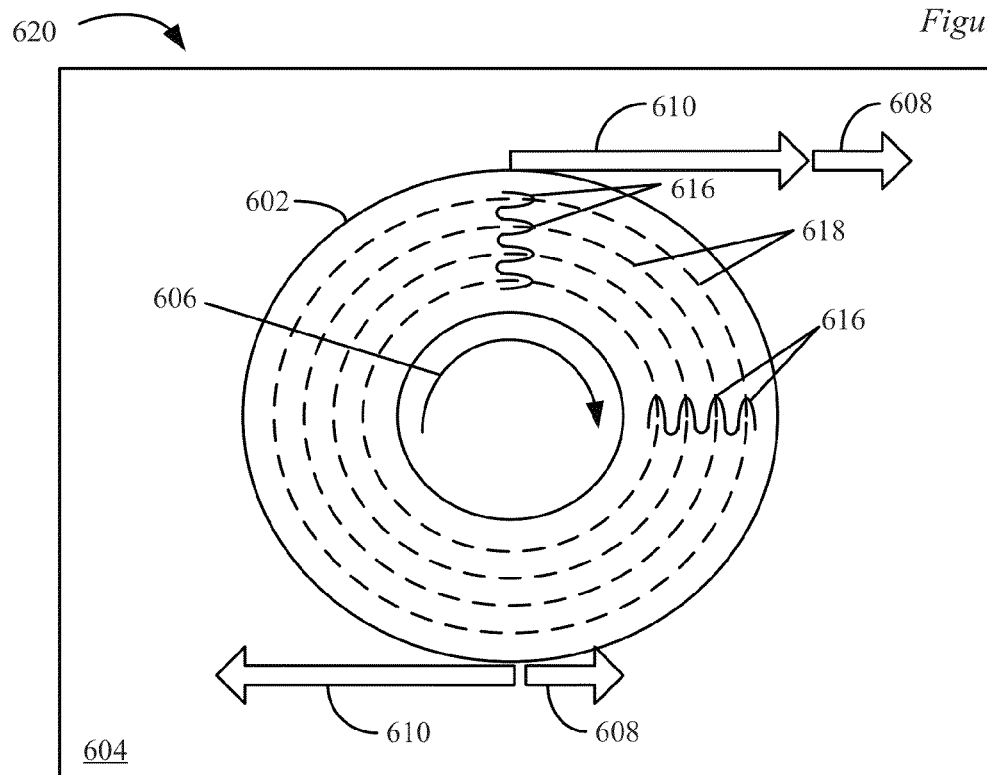

FIGS. 12*a* and 12*b* are an illustration of a circular disk 602 configured to generate multiple magnetic field flux line configurations. The circular disk 602 can be rotated in the clockwise direction 606 above a conductive substrate 604. A velocity 610 at the edge of the circular disk 602 is shown at two locations. As described above, the circular disk 602 can also be moved with a translation velocity, such as 608. Some effects related to the translation velocity in combination with the rotational velocity, which affect the amount of magnetic lift which is generated, are discussed below.

In 600, the magnets on the circular disk 602 are arranged such that the peak strengths of the magnetic field flux lines are aligned with radial lines, such as 614. The effect is illustrated with respect to 612, which shows a pattern of peaks at the radial lines and valleys between the lines for three radial lines. Although not shown, this pattern extends in the circumferential direction around the entire disk 602.

The maximum value of the peaks can be varied in the radial direction, if desired, using different strength magnets. For example, the peaks can be greater near the outer edge as opposed to inner edge. However, the peaks with different strength values can still be aligned with the radial lines as shown in 612.

In 620, the magnets on circular disk 602 are arranged such that the peak strengths of the magnetic field flux lines are aligned with circumferential lines, such as lines 618. Along each circumferential line, the strength of the magnetic field flux lines can be somewhat constant. However, the strength of the magnetic field lines can vary from circumferential line to circumferential line or it can be relatively constant from circumferential line to circumferential line.

In 616, the strength of the magnetic field lines is shown as relatively constant for each circumferential line, such as lines 618. Between the circumferential lines the strength of the magnetic field lines decreases. Thus, in 620, a series of peaks and valleys in the strength of the magnetic field lines is formed where the peaks and valleys occur in the radial direction as opposed to the circumferential direction as shown in 600.

In one embodiment, the circular disk 602 can include a mechanism which shifts the positions of the arrangement of magnets, such that the pattern of the magnetic field flux lines can be varied from the pattern in 600 to the pattern in 620. Other patterns are possible and these are provided for the purposes of illustration only. In 620, since the strength of the magnetic field is relatively constant along the circumferential lines, very little magnetic lift is generated during rotation of disk 602 as compared to the arrangement in 600. Thus, by varying the arrangement of magnets between 600 and 620, the amount of magnetic lift which is generated by disk 602 can be varied.

As described above, the circular disk 602 can be moved with a translational velocity, such as 608. As shown in FIGS. 12A and 12B, on one side of the disk 602, the velocity of the circular disk 602 is increased related to the conductive mass 604 and other side of the disk 602 the velocity of the circular disk 602 is decreased relative to the conductive mass. If the magnitudes of the translational velocity and the rotational velocities are similar, then the amount of magnetic lift can vary significantly from one side of the disk 602 to other side of the disk 602.

In 620, since the magnetic lift generated due to rotation is minimal in this configuration, the translation velocity component doesn't cause the amount of magnetic lift which is generated to vary from one side of the 602 to the other side of the disk 602 as compared to the configuration in 600. However, in 620, when the translation velocity is of a significant magnitude, magnetic lift can be generated as a result of the translational movement of the disk 602. This effect can occur while the disk 602 is rotating or not rotating.

In 600, while disk 602 rotating at a high rate, the amount of magnetic lift which is generated as a result of the translational movement of the disk 602 may be small whereas the amount of magnetic lift due to the rotation can be large. However, as the disk 602 is slowed rotationally and brought to a stop, the amount of magnetic lift resulting from the rotational movement will decrease and the amount magnetic lift resulting from translational movement will increase. When the translational velocity is large enough, in the configuration shown in 600 at rest rotationally, the magnetic lift generated from translational motion may replace the magnetic lift generated from rotational motion.

Thus, in some embodiments, the rotational rate of an object, such as circular disk 602, can be varied to allow different amounts of magnetic lift to be harvested from rotational velocity as opposed to translational velocity. Similarly, the pattern of magnetic field flux lines of an object, such as circular disk 602, can be varied to allow different amounts of magnetic lift to be harvested from rotational velocity as opposed to translational velocity. For example, as described above, a mechanism can be provided which cause an arrangement of magnets on an object to be altered such that the pattern of magnetic field flux lines of the object is altered.

Figure 13:
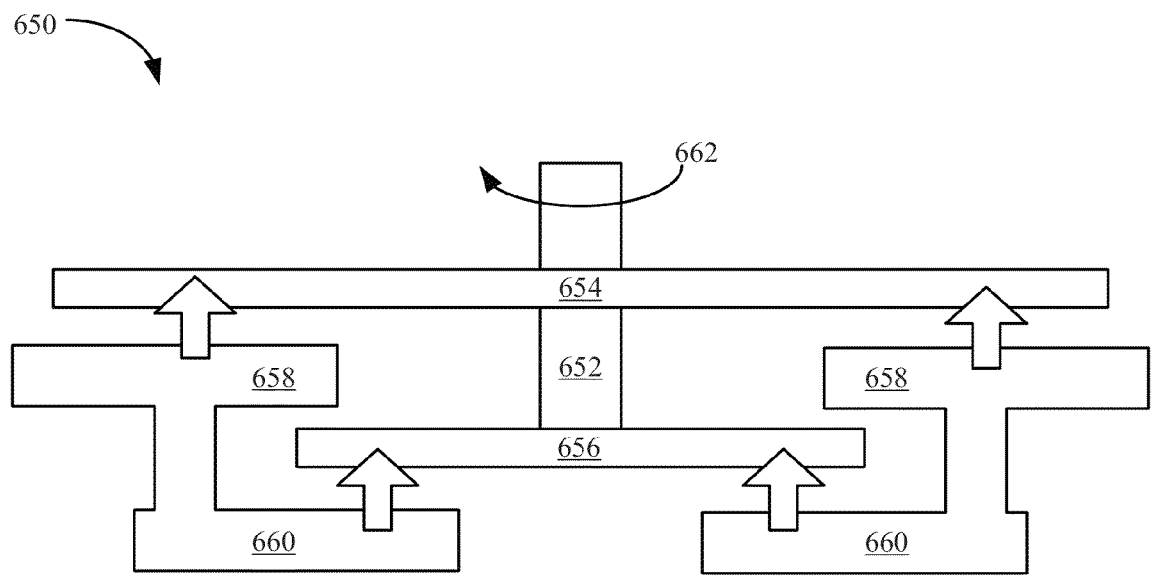
FIG. 13 is an illustration of a stacked rotor configuration for generating magnetic lift in accordance with the described embodiments.

FIG. 13 is an illustration of a stacked rotor configuration 650 for generating magnetic lift. In 650, two rotors, which each include an arrangement of magnets, 654 and 656 are shown coupled to a shaft 652. The shaft 652 can rotated at some rate, such as 662. Depending on how the rotors 654 and 656 are coupled to the shaft 652, the rotors can rotate at the same rate as the shaft or a different rate from the shaft. Further, each rotor may rotate at the same rate relative to one another or at different rates.

The rotors 654 and 656 are arranged in a stacked configuration. Two rotors are shown stacked one above another. However, in alternate embodiments, more than two rotors can be arranged in a stacked configuration. Thus, this example is provided for the purposes of illustration only and is not meant to be limiting.

The rotors are arranged above conductive masses 658 and 660, respectively, where the conductive masses are at different levels. As example, this configuration could be part of a track. The arrangement allows each rotor, 654 and 656, to interact with a conductive mass and generate magnetic lift. With a stacked configuration, such as 650, it may be possible to generate an equal amount of magnetic lift as a single rotor with a larger radius. In some instances, it may be desirable to reduce the radial foot print of a magnetic lifting device in which case a stacked rotor configuration may be useful.

In other embodiments, a track can be curved. For example, a track can be an enclosed tube where a device moves within an interior of the tube or the device moves over an exterior portion of the tube. In another example, a track can include a curved portion, such as a curved trough. In various embodiments, as described above, the rotors can include a curved substrate. For example, a rotor can be spherically shaped. A curved substrate can be used to better conform a rotor to a curved track. For example, a curved substrate may allow the rotor to conform to a track which includes a curved trough, i.e., fit within the trough. As another example, the curved substrate may allow a rotor to better conform to an interior of a tube when coupled to a device which moves within a tube.

Magnetic Lifting Systems Having Multiple Rotating Disks

In this section, embodiments of magnetic lifting devices including multiple rotating disks are described with respect to FIGS. 14-20. In particular, details of the drive configurations where a number of disks vary from configuration to configuration are described. For example, a two disk configuration is described with respect to FIGS. 14, 15 and 16. Whereas, configurations having three and four disks are described with respect to FIGS. 17-20.

Figure 14:
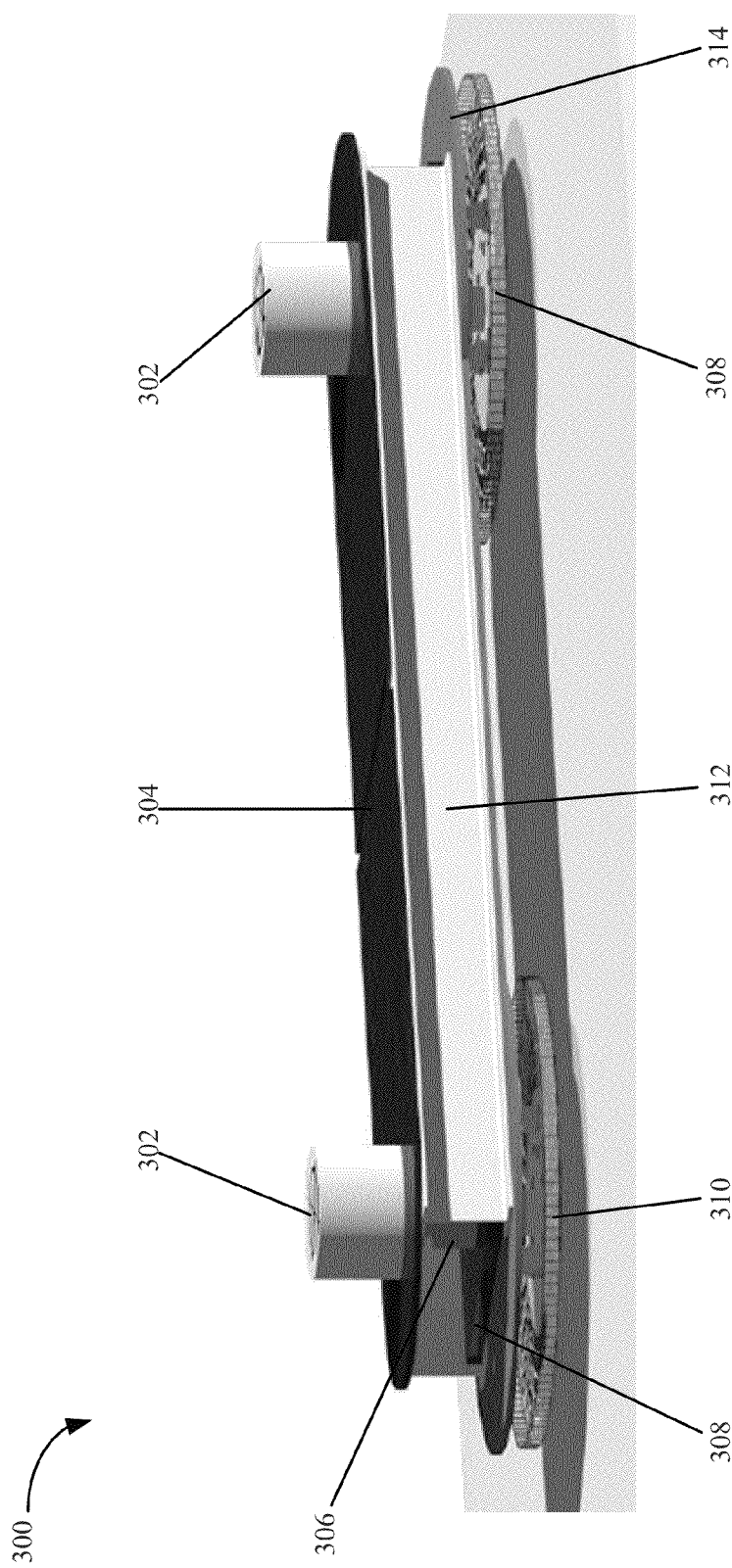
FIG. 14 is a perspective view of a magnetic lifting device including two independently rotatable disks with magnetic arrays in accordance with the described embodiments.
Figure 15:
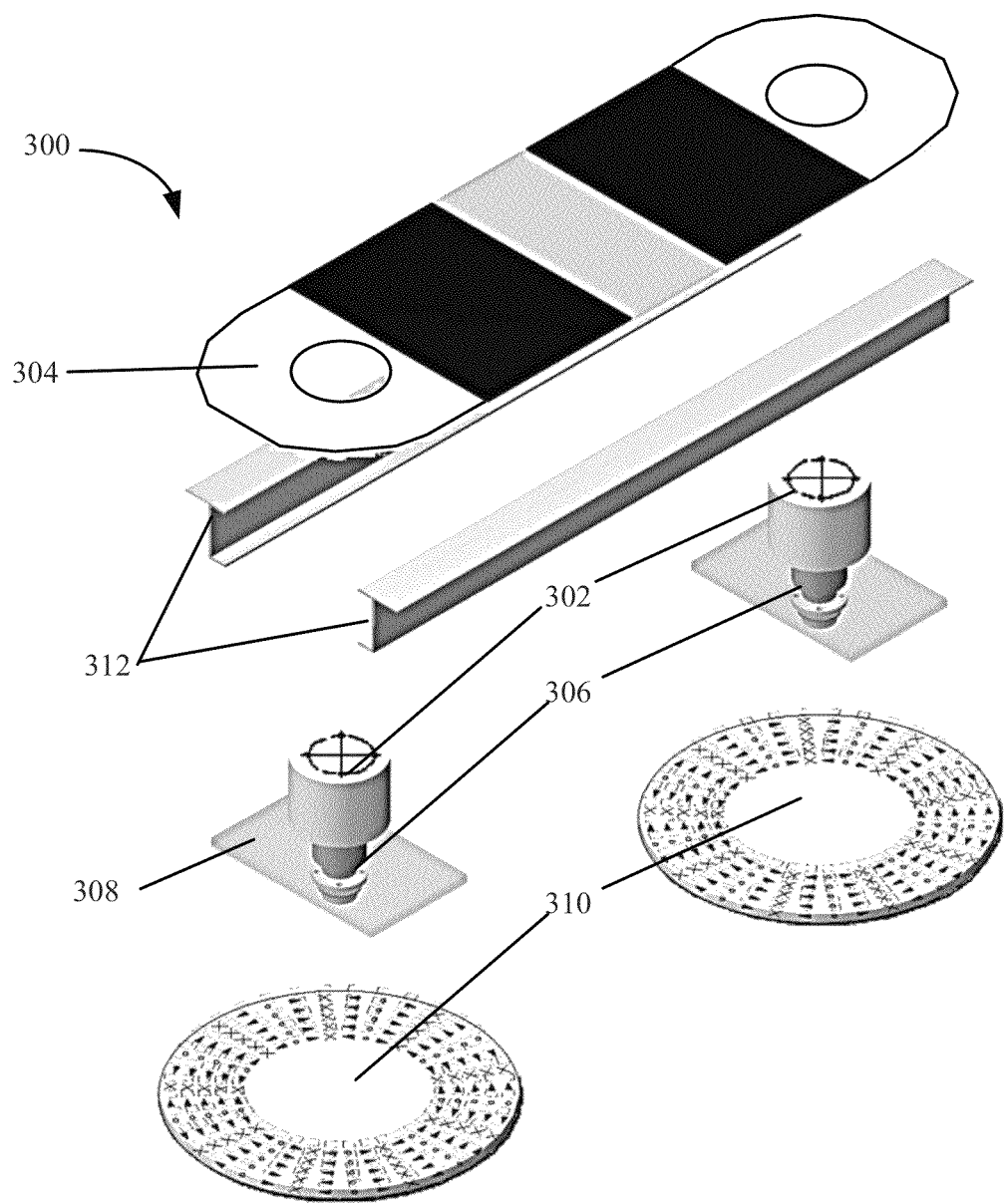
FIG. 15 is an exploded axonometric view of the magnetic lifting device in FIG. 11 in accordance with the described embodiments.

FIG. 14 is a perspective view of a magnetic lifting device 300 including two independently rotatable disks with magnetic arrays, 308 and FIG. 15 is disassembled view of device 300. The device 300 includes two motors 302 for driving the rotatable disks 310. The motors 302 are coupled to the rotors 310 via two shafts, such as 306.

The device 300 includes two rigid members 312 which structurally link the two motor 302 and rotor 310 assemblies to one another. A platform 304 is configured to rest above the two rigid members 312. The platform 304 includes two apertures receiving a shaft of the motor. The diameter of the apertures can be less than diameter in the motors 302 but large enough to receive the shafts of the motors. Thus, the shafts 306 of motors 302 can extend through the apertures while the motor rests on top of the platform 304.

A mounting plate 308 can be coupled to each shaft 306. The structural members 312 can rest on top of the mounting plates 308 and can be sandwiched between the platform 304 and the mounting plates. In one embodiment (not shown), a bottom panel can rest of the ledges of the structural members. The platform 304, the rigid structural member and the bottom panel can form an enclosure. In another embodiment, a bottom panel may not be included and the bottom of the enclosure can be open.

A power source and circuitry used to power the device 300 including the motors 302 can be located below platform 304 and coupled to the rigid members and/or platform 304. In one embodiment, the power source can be one or more batteries or fuel cells. In additional embodiment, a combustion motor coupled to a fuel tank can be used. In yet another embodiment, the device 300 can be externally powered, such as via an AC voltage source, and a power converter can be located in this area which converts the AC voltage to a power format utilized by the motor and the other circuitry included with device 300.

Dimensions of the device are approximately 18 inches wide by 50 inches long by 9 inches tall. The device weighs 70 pounds. With one magnet configuration, the device can lift a payload of about 250 pounds, i.e., the weight of the device and the weight of the payload is about 320 pounds. Thus, the ratio of the weight of the device loaded (320 pounds) to the weight of the device unloaded (70 pounds) is greater than a factor of four. Other configurations with different loading parameters are possible and this example is provided for illustrative purposes only. In another embodiment, the dimensions are 14 inches by 40 inches by 4 inches tall and weighing 70 pounds where the device can lift a payload of 500 pounds.

In operation, a payload can be placed on platform 304. For example, a person may be able to stand on the platform 304 while the device 300 hovers in place. In one embodiment, the device may be able to hover with a payload of up to 250 pounds. In another embodiment, the device may be able to hover with a payload up to 300 pounds. A shield 314 can prevent an object from interfering with the disks 304, such as a person stepping on the disks or a payload from falling off the payload platform and hitting the disks 308.

A rechargeable battery pack can be included which powers the device 300 for up to 20 minutes. In another embodiment, the battery pack can power the device 300 for up to ½ hour. In yet another embodiment, the battery can power the device 300 for an hour or more.

In particular embodiments, the motors can be independently controlled allowing the rotors 308 to rotate at different rates. In some operational modes, it may be desirable to rotate the disks 308 at the same rate. In a particular embodiment, the disks can be coupled in some manner so that the disks rotate at the same rate. In one embodiment, the disks 308 can be configured to counter rotate to limit global rotation of the device 300. In such a configuration, the disks can be driven at different velocities to induce a global rotation of the device.

In alternate embodiments, a single motor can be used to drive more than one rotor, such as 308. For example, to drive both rotors 308, a single motor can be coupled to a belt or chain which is coupled to each of the shafts 306. For balance purposes, the motor can be located in a center of platform 304. Also, a single motor can be located off center to balance a weight of other objects, such as a battery pack, like balancing a see-saw.

To propel the device in a particular direction, a person can stand on the device with one foot and push off with the other foot. In another embodiment, a person may be able to tilt the device to temporarily decrease the hovering height on one portion of the vehicle and increase it on another portion. The temporary imbalance, which is created, can cause the vehicle to move in a particular direction. The members 312 may include some flex to allow the motor and rotor assembly to change orientation relative to one another as a means of control. In one embodiment, a pivot or some joint can be disposed at location along each member 312 to provide additions flex.

In another embodiment, a bar with a handle can be coupled to the device 300. In operation, a payload can be placed on the device 300. Then, via the bar, a person can pull or push the device 300 and the payload. For example, the device 300 can be used to replace the wheels on a wagon where the wagon is pulled or pushed by a person.

In FIGS. 14 and 15, the motors extend above platform 304. In other embodiments, the motors can be located below the platform 304, such as enclosed within a housing. In FIGS. 14 and 15, the rotors are exposed, such that a bottom can hit the ground and sides of each rotor 308 are exposed. In other embodiments, a housing can extend downwards, such as from shield 314, to cover the sides of the rotor. In other embodiments, as described above, the housing can extend beneath the rotors 308, such that a portion of the bottom of the rotor is enclosed or the entire rotor is enclosed.

Figure 16:
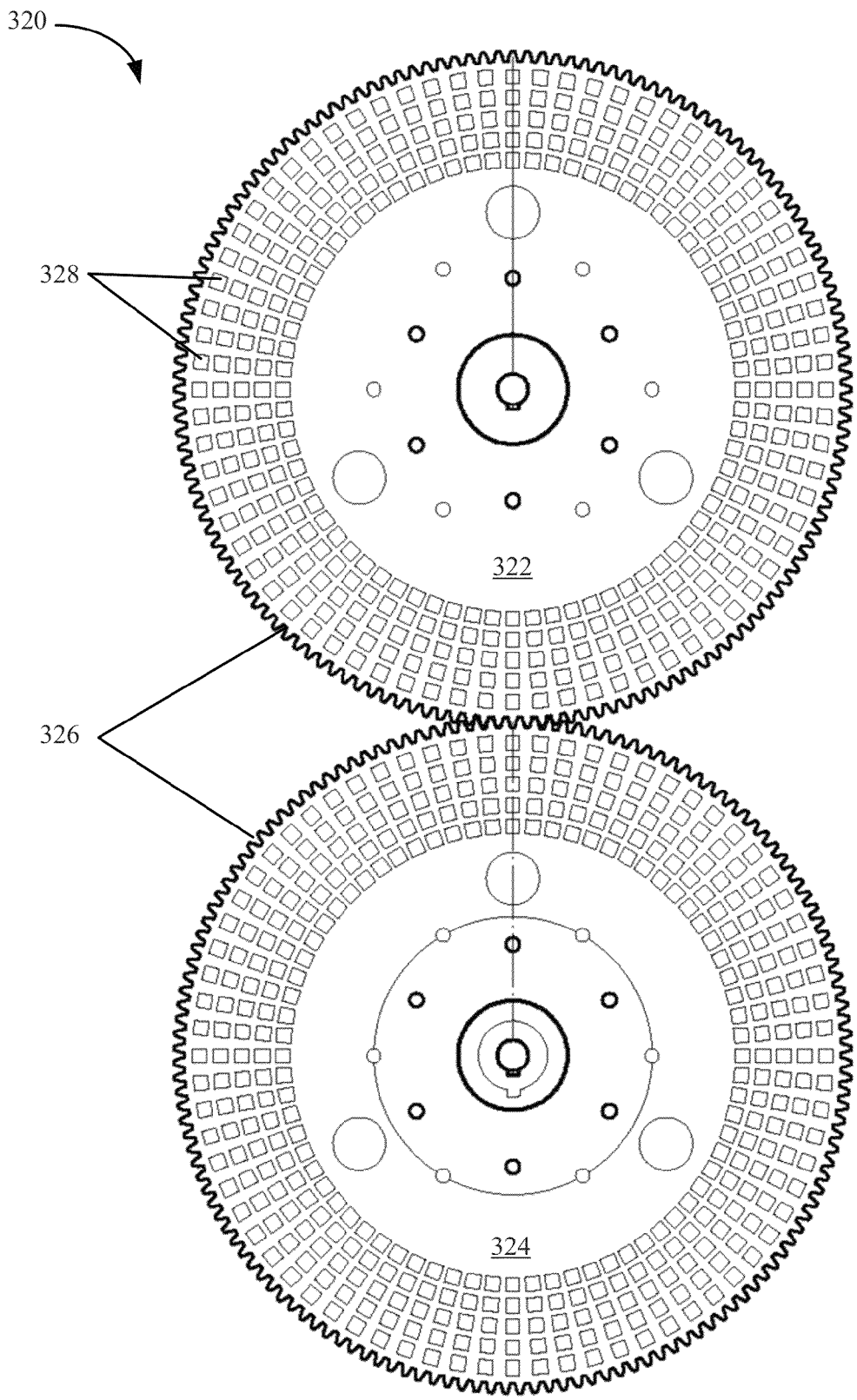
FIG. 16 is an illustration showing a top view of two linked and rotatable disks including magnetic arrays used to generate magnetic lift in accordance with the described embodiments.

Next some additional, rotor configurations are described with respect to FIGS. 16-20. FIG. 16 is an illustration showing a top view 320 of two linked and rotatable disks, 322 and 324, including magnetic arrays used to generate magnetic lift. Disks 322 and 324 include teeth 326 and magnets 328. The teeth are arranged to interlock during rotation.

With interlocking teeth, disks 322 and 324 rotate at the same rate. However, the disks rotate in opposite directions to cancel their angular momentum. In operation the disks, 322 and 324, can be powered by a single motor or multiple motors. For instance, a single motor can be coupled to a drive shaft aligned with a center axis of each rotor and coupled in some manner to each rotor, such as via a belt system. As another example, a single motor can include a shaft which is coupled to a first rotor such that the first rotor is turned by the motor and the second rotor is turned via the interlocking teeth interface between the two rotors.

Figure 17:
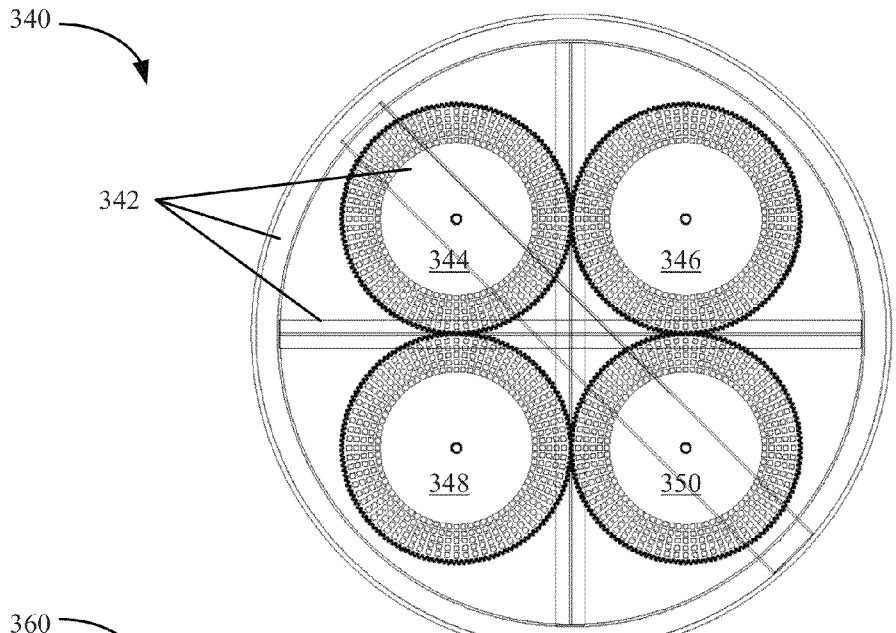
FIGS. 17 and 18 are illustrations showing top views of two different arrangements of four rotatable disks including magnetic arrays for generating magnetic lift in accordance with the described embodiments.

Next, with respect to FIGS. 17 and 18, four rotor configurations are described. FIGS. 17 and 18 are illustrations showing top views of two different arrangements of four rotatable disks including magnetic arrays, 344, 346, 348 and 350 configured to generate magnetic lift. Thus, in some embodiments, two rotors rotate in a first direction and two rotors rotate in a second direction opposite the first direction, such as clockwise and counter clockwise. The four rotors can be surrounded by a structure 342, which supports and structurally links the rotors.

The rotors, 344, 346, 348 and 350 can be driven by a single motor, two motors, three motors, four motors, five motors, etc. For example, a single motor can include a shaft which is coupled to a shaft through the center of one of the rotors via a belt. The motor can be located between the four rotors for balance purposes. Then, the four rotors can be coupled to one another so that turning one rotor turns all four rotors. As another example, two motors each over the top of two rotors, such as 346 and 348, can be used to drive the four rotors. As an example, three motors can be used where one is coupled to two rotors and two are each coupled to a single rotor. In another example, four rotors can each drive a single rotor.

FIG. 18 illustrates another four rotor configuration including rotors having magnetic arrays 364a, 364b, 364c and 364d. The four rotors are surrounded by a housing 372. The four rotors, 364a, 364b, 364c and 364d each include a gear 362a, 362b, 362c and 362d. Gears are 362b and 362c are coupled to a drive belt 370 which interfaces with gears 366 and 368. Similar guides and a belt can be provided for rotors 364a and 364d, but, at a different height to avoid interfering with one another. The guides and rotors can be symmetrically arranged as indicated by angle 374, which can be varied.

In one embodiment, the gears 366 and 368 may act as guides for chain 370. In another embodiment, a motor can be coupled to one or both of gears 366 and 368. The motor or motors can translate the belt 370, which then rotates gears 362b and 362c, which turns the rotors. In another embodiment, motors can be located over the top of each of rotors 362b and 364c and include a shaft which is coupled to the rotors.

Figure 19:
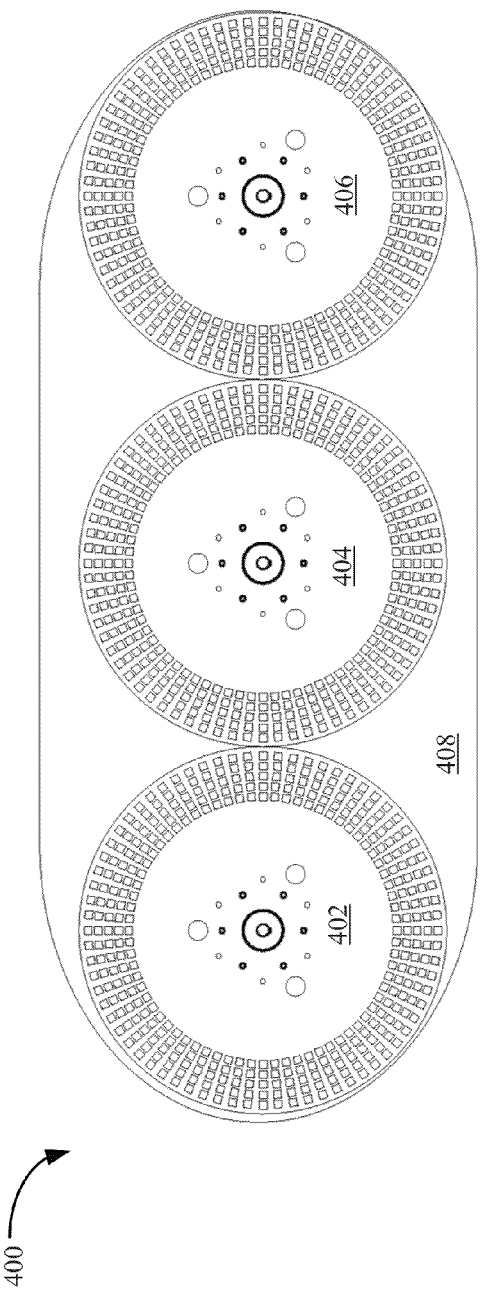
FIG. 19 is in illustration of a top view of a magnetic lifting device including an arrangement of three rotatable disks including magnetic arrays used to generate magnetic lift in accordance with the described embodiments.
Figure 20:
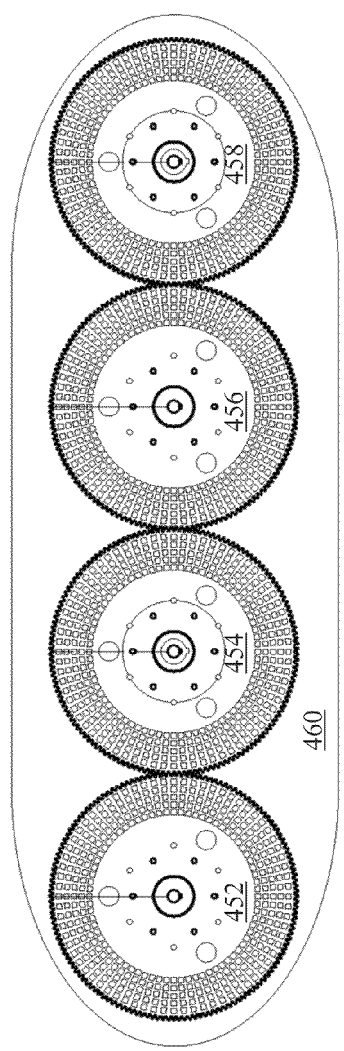
FIG. 20 is an illustration of a top view of a magnetic lifting device including an arrangement of four rotatable disks including magnetic arrays used to generate magnetic lift in accordance with the described embodiments.

Next, three and four rotor in-line configurations are described. FIG. 19 is an illustration of a top view of a magnetic lifting device 400 including an arrangement of three rotatable disks including magnetic arrays, 402, 404, 406 used to generate magnetic lift. FIG. 17 is an illustration of a top view of a magnetic lifting device 450 including an arrangement of four rotatable disks, 452, 454, 456 and 458 including magnetic arrays used to generate magnetic lift. Device 400 and device 450 are surrounded by housing 408 and 460, respectively.

The three and four rotors are arranged along a single line through their center axes. The three and four rotors are each shown with the same size. In other embodiments, the rotors can be different sizes. For example, rotors 402 and 406 can be smaller that rotor 404. In yet another embodiment, the three rotors 402, 404 and 408 can be arranged in a triangular configuration. Also, the magnetic properties, such as the strength of the magnetic field in a particular direction can be varied from rotor to rotor. The strength of the magnetic field in a particular direction can be also varied by using magnet arrangements which vary from rotor to rotor.

Again, a single or multiple motors can be used. For example, each rotor can be associated with a motor that allows the rotors to be independently driven. In the three rotor configuration of device 400, two rotors can be rotated in one direction and the other rotor can rotate in the opposite direction. The two rotors and the single rotor may be driven at different rates. The three rotors can be rotationally coupled so that all the rotors rotate at the same rate, two rotors can be rotationally coupled while a third rotor can be rotated at a different rate or each of the rotors can be rotated at different rates independently of one another.

In the four rotor configuration of 450, two rotors can rotate in one direction while two rotors rotate in an opposite direction to cancel the angular momentum. In one embodiment, the rotors can be each rotated at different rates. However, the rates for the rotors can be selected such that the sum of the angular momentum for all of the rotors cancels out. In another embodiment, the rates can be selected to not cancel to cause the device to rotate at some rate in a particular direction according to the excess angular momentum.

In yet other embodiments, two pairs of rotors can be each rotated at the same rate where the rate between each pair of rotors is varied. In an additional embodiment, three rotors can be each rotated at a first rate and a fourth rotor can be rotated at a second rate. For example, three rotors can be coupled to one another while a fourth rotor is not coupled to the other three rotors and thus can be rotated at a different rate. In a further example, all four rotors can be coupled to one another so that the rotors all rotate at the same rate.

Magnetic Lifting System Applications

Next, some applications of the magnetic lift devices are described with respect to FIGS. 21, 22, 23, 24 and 25. The applications are provided for the purposes of illustration and are not meant to be limiting.

Figure 21:
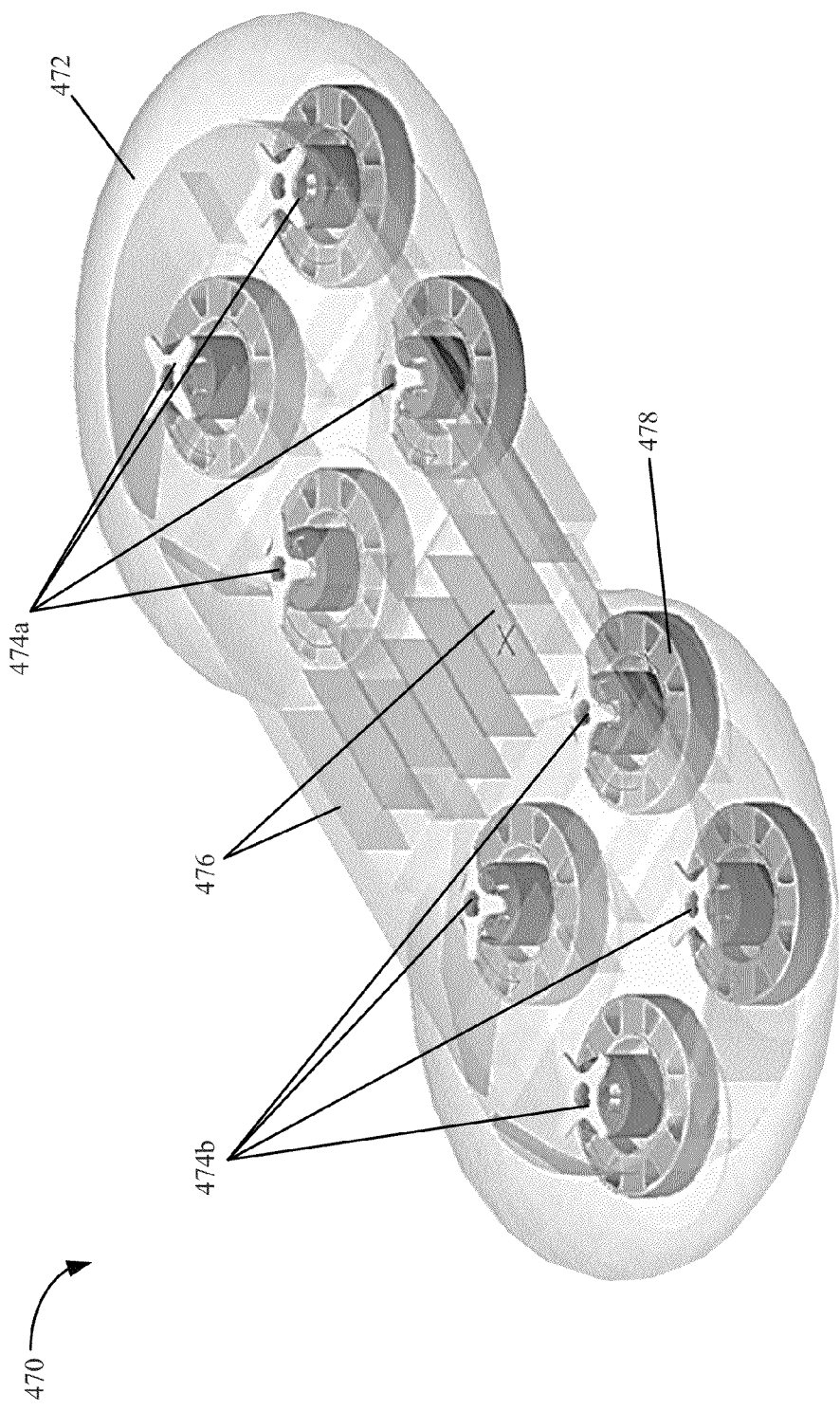
FIG. 21 is an illustration of a perspective view of a magnetic lifting device including an arrangement of eight rotatable disks including magnetic arrays used to generate magnetic lift in accordance with the described embodiments.

FIG. 21 is an illustration of a perspective view of a magnetic lifting device 470 including an arrangement of eight rotatable disks including magnetic arrays used to generate magnetic lift. The eight rotatable disks are grouped into two groups of four disks each 474a and 474b. Between the disks are a number of battery packs 476.

A housing 472 encloses the rotatable disks and the battery packs 476. In one embodiment, the rotatable disks are each individually driven by a separate brushless motor. The brushless motors are each configured to receive power from the battery packs 476. In one embodiment, eight one inch cube NdFeB magnets, such as 478, are including in each of the rotatable disks to form the magnetic array associated with each disk. Device 470 can be configured to carry up to five hundred pounds.

In one embodiment, an attachment arm and handle can be coupled to the housing 472. For example, the attachment arm can extend perpendicularly from a top surface of housing 472 or might be mounted at angle to the top surface of the housing 474. The attachment arm and handle might be used by person standing on device 470 to steady themselves or it might be used by a person adjacent to device 470 to pull or push the device 470.

Figure 22:
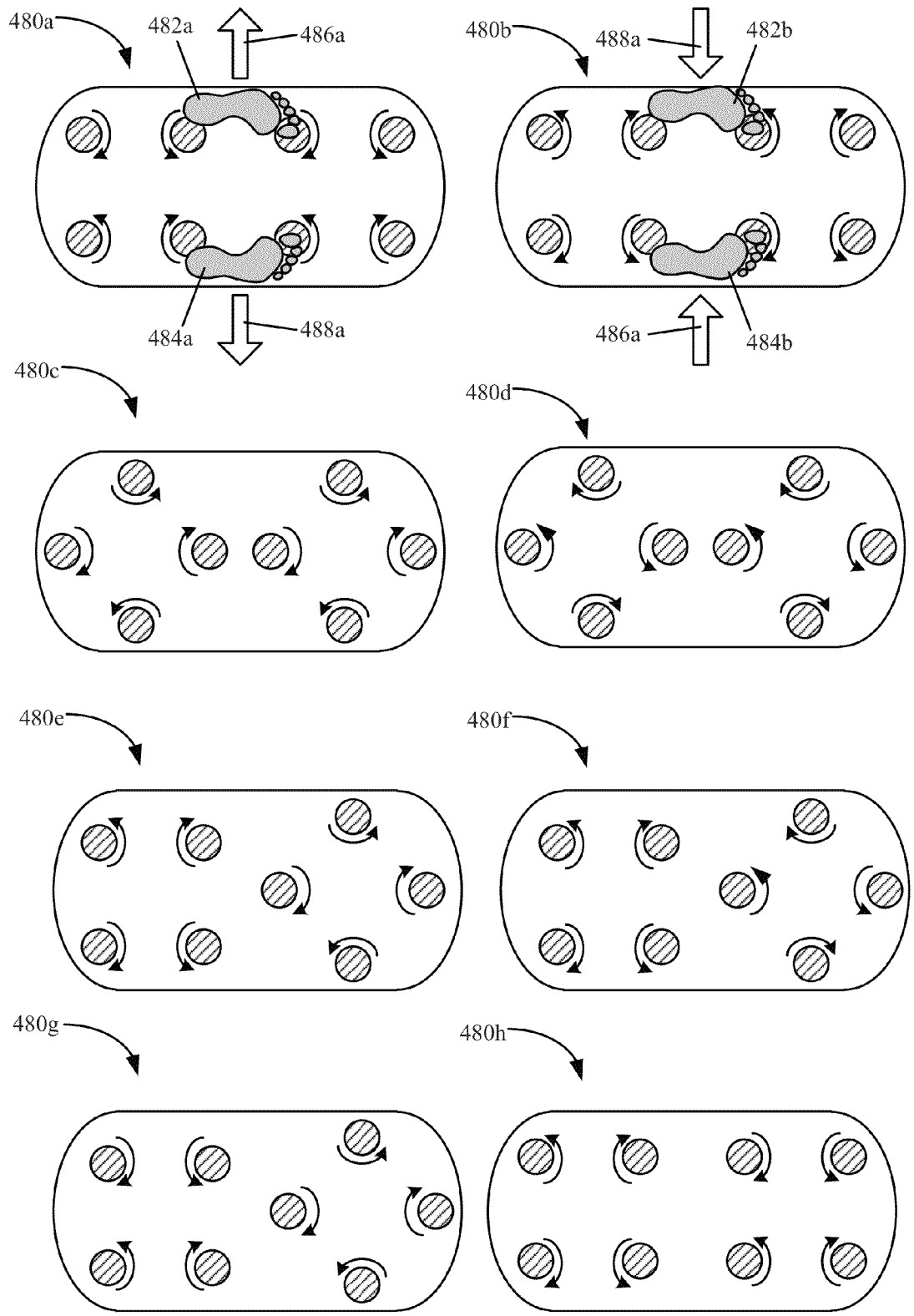
FIG. 22 are illustrations showing top views different arrangements of eight rotatable disks including magnetic arrays for generating magnetic lift in accordance with the described embodiments.

FIG. 22 are illustrations showing top views different arrangements, 480a-480f, of eight rotatable disks including magnetic arrays for generating magnetic lift. In one embodiment, the eight rotatable disks can be driven in different rotational directions such that the net torque is zero. In each of the examples 480a-480f, the eight rotatable disks are each arranged to rotate in a number of different directions, as shown by the arrows next to each of the circles which represent the magnetic arrays. As shown, the magnetic arrays can be arranged in a number of different patterns where the net torque is zero.

In one embodiment, for certain magnet configurations, the rotatable disks can be placed close enough to one another such that the rotatable disks attract one another. The attractive forces between the rotating disks can help to maintain a constant rotational velocity between each of the adjacent disks. In essence, the attractive forces can act as virtual spur gears which mimic the effects of actual spur gears, such as the gears shown above in FIG. 17.

The rotational configurations of the eight rotatable disks can cause the devices, such as 480a-480f to have different control characteristics. For example, in 480a, when a person is standing on the device 480a at locations 482a and 484a, a shift of more weight to location 482a as compared to 484a can cause the device to move in direction 486a. Conversely, a shift of more weight to location 484a as compared to location 482a can cause the device to move in direction 488a.

In 480b, which uses a different rotational configuration as compared to 480a, the directional response of the device in 480b is opposite that of 480a. In particular, when a person is standing on the device 480b at locations 482b and 484b, a shift of more weight to location 482b as compared to 484b can cause the device to move in direction 488a. Conversely, a shift of more weight to location 484b as compared to location 482b can cause the device to move in direction 486a.

Figure 23:
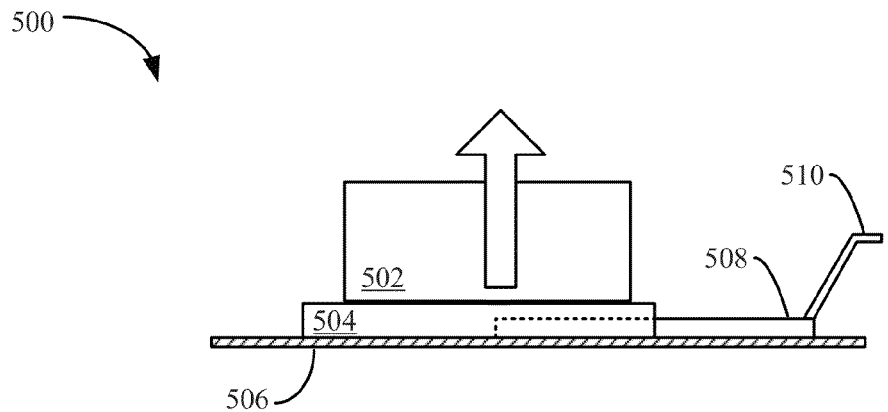
FIGS. 23 and 24 are illustrations of two magnetic lifting systems in accordance with the described embodiments.
Figure 24:
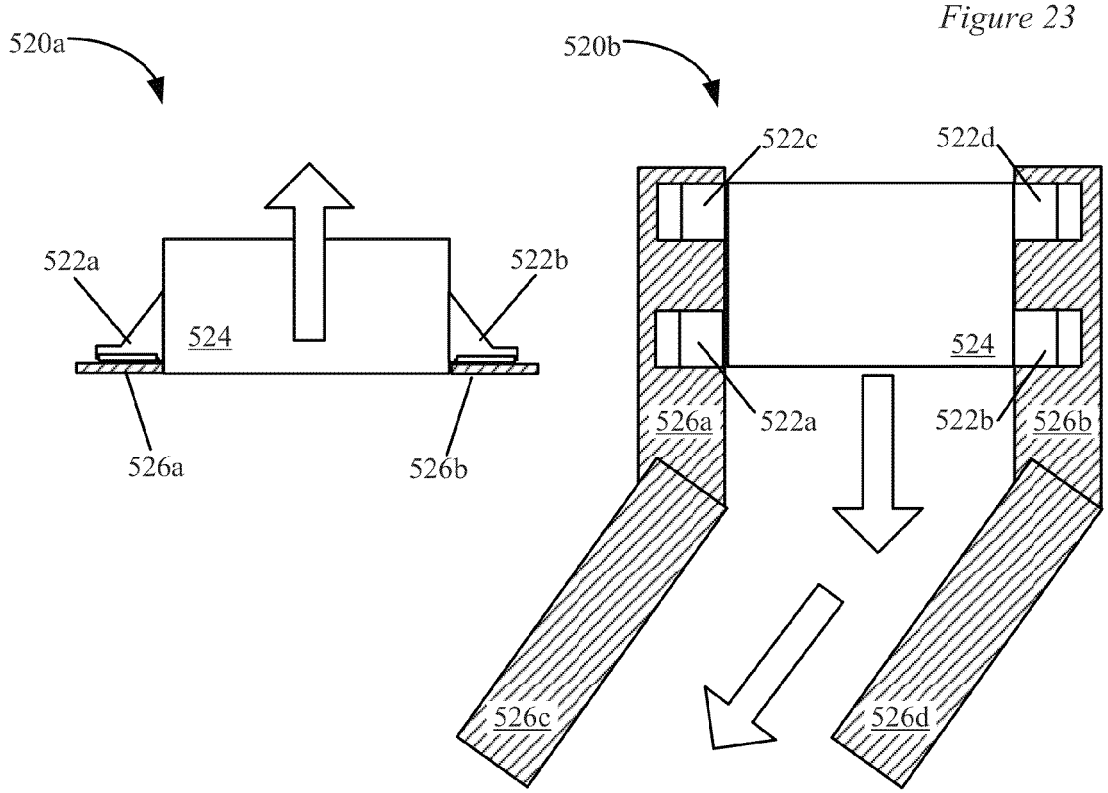

FIGS. 23 and 24 are illustrations of two magnetic lifting systems in accordance with the described embodiments. The systems, 500 and 520a, include one or more magnetic lifting device which generate magnetic lift and a conductive substrate in which an eddy current effect is generated for magnetic lifting purposes.

In 500, a payload 502 rests on a pallet 504. The pallet 504 rests on a conductive substrate 506. The pallet 504 provides a height clearance which allows a magnetic lifting device 508 to be slid underneath the pallet 504.

In one embodiment, the magnetic lifting device 508 can be slid underneath the pallet while magnetic lift is not being generated. For example, the magnetic lifting device 508 can include wheels which allow it to be rolled under the device. After the magnetic lifting device 508 is placed underneath the payload, it can be turned on and magnetic lift can be generated. Then, the payload 502 and pallet 504 can be lifted off the ground while the magnetic lifting device 508 hovers in place.

In another embodiment, the magnetic lifting device 508 can be turned on and reach a first equilibrium height. At the first equilibrium height, the magnetic lifting device can be slid under the pallet 504 while it is hovering. After the magnetic lifting device 508 is in place underneath the pallet 504, the hover height of the magnetic lifting device 508 can be increased such that it lifts the pallet 504 and the payload 502 while it is hovering at a second equilibrium height.

In this example, a person might use handle 510 to input a force to move the magnetic lifting device 508, pallet 504 and payload 502 to another location. When the pallet is in its desired location, the hover height of the magnetic lifting device 508 can be lowered such that the pallet 504 again contacts the conductive substrate 506. Then, the magnetic lifting device 508 can be slid out from underneath the pallet 504.

In a traditional lifting device with wheels, such as a pallet lifter with cylindrical shaped wheels, the maneuverability of the lifting device is constrained because the wheels usually provide a preferred direction of motion depending on the direction the wheels are pointing, i.e., friction is greater in on direction than another direction. This limitation sometime makes it difficult to maneuver the pallet lifter in locations with limited clearance. With the magnetic lifting devices described herein, while the devices are hovering, movement in any direction is equally feasible because there is not more friction in one direction as opposed to another direction. Thus, it may be possible to maneuver the magnetic lifting device in tight spaces much easier than when using a wheeled device.

In FIG. 24, a front view 520a and a top view 520b of magnetic lifting devices 522a, 522b, 522c and 522d next to a payload 524 are shown. The payload is a rectangular box. The payload 524 can rest on some surface. The surface may not be a conductive surface capable of holding an eddy current. Thus, a conductive track, such as 526a and 526b, can be placed on either side of the payload 524. Then, one or more magnetic lifting devices can be maneuvered onto the conductive tracks. The one or more magnetic lifting devices can be coupled to the payload in some manner and then turned on to lift the payload 524. While hovering, the payload 524 can be guided along the track.

In this example, four separate magnetic lifting devices 522a, 522b, 522c and 522d are maneuvered onto the track. In other embodiments, the magnetic lifting devices can be structurally linked to one another. For example, the magnetic lifting devices can be linked via a "U" shaped structure, to form a single device with four components for generating magnetic lift. In general, a magnetic lifting device can include one or more components for generating magnetic lift. The "U" shaped structure can allow the magnetic lifting device to be slid around the sides of the payload via its open end. In one embodiment, the distance between the sides of the "U" can be adjustable to bring the sides closer to the payload.

In one embodiment, multiple track component pairs can be used. The tracks can be configured to partially overlap allowing the magnetic lifting device and payload 524 to be slid from a first pair of tracks, such as 526a and 526b, and onto the second pair of tracks 526c and 526d. Then, the first pair of tracks, 526a and 526b can be lifted up and placed in front of the first pair of tracks and the payload can be moved from the second pair of tracks to the first pair of tracks. The process can be repeated until the payload is moved to its desired location.

In a particular embodiment, the conductive tracks, such as 526a and 526b, can include guides. The guides can be one or more raised edges. The height of the raised edges can be selected to keep the magnetic lifting device from sliding off a side of the conductive track.

Figure 25:
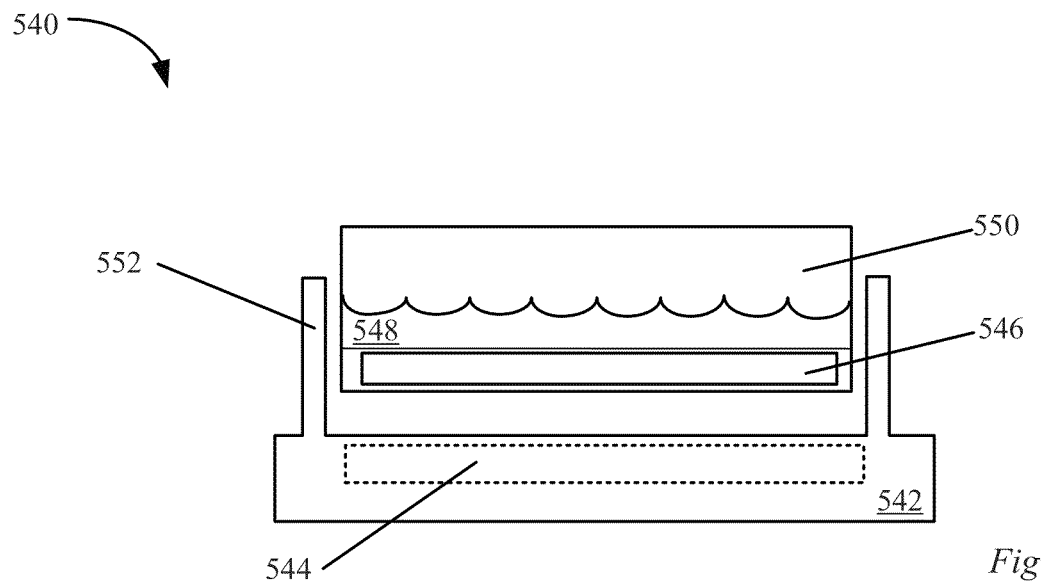
FIG. 25 is an illustration of a magnetic lifting and heating system in accordance with the described embodiments.

FIG. 25 is an illustration of a magnetic lifting and heating system 540 in accordance with the described embodiments. The lifting and heating system can include a component 544 for generating magnetic lift. As described above, in one embodiment, the component can be a rotatable disk with an arrangement of magnets. The component can be placed in housing 544. The housing 542 can include guides 552 for constraining a vessel, such as a cylindrical pot 550.

The vessel 550 can include a conductive component 546. In operation, component 544 can be rotated. The rotation can cause an eddy current to form in conductive component 546. An arrangement of magnets in component 544 can be selected such that the magnetic field is stronger above the component than below the component. Energy from the generated eddy current scan cause heat to be dissipated from the conductive component 546. The dissipative heat can heat a substance 548, such as a liquid, in the vessel 550. For example, water can be heated and possibly boiled to kill bacteria. When the magnetic lift is sufficient, the vessel may also levitate during this process.

In one embodiment, component 544 can be turned by a motor. The motor can be electric and plugged into an outside source, powered by a battery, solar powered or combinations thereof. In another embodiment, the component 544 can include a mechanism which allows it to be turned by a hand crank.

Embodiments of the present invention further relate to computer readable media that include executable program instructions for controlling a magnetic lift system. The media and program instructions may be those specially designed and constructed for the purposes of the present invention, or any kind well known and available to those having skill in the computer software arts. When executed by a processor, these program instructions are suitable to implement any of the methods and techniques, and components thereof, described above. Examples of computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A magnetic lifting device comprising:
   a rotor including an arrangement of magnets wherein a rotation of the rotor causes a generation of magnetic lift when the magnetic lifting device is placed on a conductive substrate;
   a motor coupled to the rotor;

an actuator configured to generate a force which changes an angle of the rotor relative to the conductive substrate;

a payload platform configured to receive a payload;

an input mechanism configured to receive, a user initiated input signal;

one or more sensors to determine an orientation of the magnetic lifting device relative to a reference plane wherein the one or more sensors including an accelerometer;

a control system, including a controller having a processor and a memory, coupled to the motor, the actuator, the input mechanism and the one or more sensors, configured to 1) control the motor to rotate the rotor at a rotational velocity which causes the magnetic lifting device and the payload to hover in free flight at a height above the conductive substrate wherein the weight of the payload and magnetic lifting device is greater than one hundred pounds, 2) receive the user initiated input signal, 3) receive sensor data from the one or more sensors and 4) in response to the user initiated input signal and using the sensor data, control the actuator to change the angle of the rotor to cause the magnetic lifting device, including the motor, the rotor, the payload platform, to translate from a first position to a second position above the conductive substrate while hovering;

wherein the rotor, the motor, the payload platform, the controller are structural linked to one another.

2. The magnetic lifting device of claim 1 wherein the actuator is configured to tilt one or more of the motor, a shaft connecting the rotor to the motor or the rotor, to change the angle.

3. The magnetic lifting device of claim 1, wherein the control system is further configured to change the rotational velocity of the rotor to hover the magnetic lifting device at different heights in response to a control signal received from an input device.

4. The magnetic lifting device of claim 1, wherein the magnets are one of permanent magnets or electromagnets.

5. The magnetic lifting device of claim 1, wherein the magnets are substantially equal sized neodymium magnets.

6. The magnetic lifting device of claim 1, wherein the motor is a combustion motor.

7. The magnetic lifting device of claim 1, wherein the motor is an electric motor.

8. The magnetic lifting device of claim 7, further comprising a battery, which is onboard with the magnetic lifting device, and which is coupled to the electric motor, to supply power to operate the electric motor.

9. The magnetic lifting device of claim 7, further comprising a power interface coupled to the motor configured to receive electrical power from a power source off-board of the magnetic lifting device.

10. The magnetic lifting device of claim 1, wherein the control system is configured to control the motor such that the magnetic lifting device lifts off from resting on the conductive substrate, rises to a hover height and then descends back to the conductive substrate.

11. The magnetic lifting device of claim 1, further comprising a plurality of rotors each including the arrangement of magnets.

12. The magnetic lifting device of claim 11, wherein a first rotor rotates in a first direction and a second rotor rotates in an opposite direction.

13. The magnetic lifting device of claim 11, wherein the plurality of rotors are configured to allow two or more of the plurality of rotors to rotate at different rotational velocities and the control system is coupled to the plurality of rotors and configured to control the plurality of rotors at different velocities to cause the magnetic lifting device to rotate.

14. The magnetic lifting device of claim 11, wherein a single motor is used to drive the plurality of rotors.

15. The magnetic lifting device of claim 11, wherein a plurality of motors is used to drive the plurality of rotors.

16. The magnetic lifting device of claim 1, wherein the rotor includes at least eight magnets.

* * * * *